United States Patent
Allred, III et al.

(10) Patent No.: US 8,528,291 B2
(45) Date of Patent: Sep. 10, 2013

(54) 3-DIMENSIONAL UNIVERSAL TUBE CONNECTOR SYSTEM

(75) Inventors: Jimmie B. Allred, III, Skaneateles, NY (US); Michael D. Griswold, Syracuse, NY (US); Michael J. Hall, Camillus, NY (US); Matthew A. Bush, LaFayette, NY (US); Joseph Kummer, Fayetteville, NY (US)

(73) Assignee: Allred & Associates Inc., Elbridge, NY (US)

( * ) Notice: Subject to any disclaimer, the term of this patent is extended or adjusted under 35 U.S.C. 154(b) by 213 days.

(21) Appl. No.: 13/084,670

(22) Filed: Apr. 12, 2011

(65) Prior Publication Data
US 2011/0194889 A1 Aug. 11, 2011

Related U.S. Application Data

(63) Continuation-in-part of application No. 12/698,220, filed on Feb. 2, 2010, now Pat. No. 8,397,463.

(60) Provisional application No. 61/323,046, filed on Apr. 12, 2010, provisional application No. 61/149,439, filed on Feb. 3, 2009.

(51) Int. Cl.
*F16B 1/00* (2006.01)
*E04B 1/38* (2006.01)

(52) U.S. Cl.
USPC ............... 52/655.1; 52/704; 52/713; 52/81.3; 403/170; 403/171; 403/173; 403/175; 403/176; 403/218; 135/909

(58) Field of Classification Search
USPC ................. 52/655.1, 655.2, 653.2, 690, 693, 52/696, 81.3, 704, 713; 403/169–176, 218; 248/62, 63, 73; 29/897.31; 446/126; 135/909
See application file for complete search history.

(56) References Cited

U.S. PATENT DOCUMENTS

| | | | |
|---|---|---|---|
| 294,344 A | 2/1884 | Adams | |
| 297,334 A | 4/1884 | Adams | |
| 346,466 A | 8/1886 | Corbett | |
| 435,156 A | 8/1890 | Schmemann | |
| 578,403 A | 3/1897 | Jeffery | |
| 1,150,781 A | 8/1915 | Louden | |
| 1,205,101 A | 11/1916 | Meyer | |
| 1,261,213 A * | 4/1918 | Clay | 403/233 |
| 1,420,671 A * | 6/1922 | Schuette | 403/176 |
| 1,535,342 A | 8/1923 | Ross | |
| 1,623,956 A | 9/1923 | Amiot | |

(Continued)

FOREIGN PATENT DOCUMENTS
GB 2147680 5/1985

OTHER PUBLICATIONS

ARRL Antenna Book—Nineteenth Edition (2000) pp. 15-13 to 15-14, figs 23-26 American Radio Relay League, Newington CT.

(Continued)

*Primary Examiner* — Robert Canfield
(74) *Attorney, Agent, or Firm* — Brown & Michaels, PC

(57) ABSTRACT

The present invention includes a system for connecting tubes or rods, which are preferably uni-directional pultruded, filament wound, or roll-wrapped carbon-fiber tubes or rods, together to form trusses and other structures using a series of connector pieces preferably bonded together with adhesive.

7 Claims, 47 Drawing Sheets

(56) References Cited

U.S. PATENT DOCUMENTS

| | | | |
|---|---|---|---|
| 1,471,520 A | 10/1923 | McCloy | |
| 1,483,602 A | 2/1924 | Bloss et al. | |
| 1,685,696 A * | 9/1928 | Gustav | 403/175 |
| 1,703,369 A | 2/1929 | Speakman et al. | |
| 1,760,955 A | 6/1930 | Moss | |
| 1,877,433 A | 9/1932 | Brook | |
| 1,955,074 A | 4/1934 | Knupp | |
| 2,487,169 A | 11/1949 | Newell | |
| 2,839,320 A | 6/1958 | Hill | |
| 2,863,682 A | 12/1958 | Canepa | |
| 3,100,555 A | 8/1963 | Ashton | |
| RE25,623 E | 7/1964 | Bristle | |
| 3,148,539 A | 9/1964 | Cook | |
| 3,229,998 A | 1/1966 | Pennington | |
| 3,507,526 A | 4/1970 | Packman et al. | |
| 3,985,459 A | 10/1976 | Gilb | |
| 4,050,210 A | 9/1977 | Gilb | |
| 4,161,088 A | 7/1979 | Gugliotta et al. | |
| 4,650,361 A | 3/1987 | Seuster | |
| 4,667,505 A | 5/1987 | Sharp | |
| 4,685,696 A | 8/1987 | Sedlmair et al. | |
| 4,840,201 A | 6/1989 | Botsolas | |
| 4,870,856 A | 10/1989 | Sharp | |
| 4,915,533 A | 4/1990 | de la Haye | |
| 5,007,666 A | 4/1991 | Kyfes | |
| 5,152,481 A | 10/1992 | Cote et al. | |
| 5,310,273 A | 5/1994 | Hara | |
| 5,346,237 A | 9/1994 | Wang | |
| D362,916 S | 10/1995 | Cetrulo | |
| D373,720 S | 9/1996 | Hirano et al. | |
| D375,451 S | 11/1996 | Ohkubo | |
| 5,711,131 A | 1/1998 | Thomas | |
| 5,918,998 A | 7/1999 | Pourmand | |
| 6,032,430 A | 3/2000 | Soukup | |
| 6,056,240 A | 5/2000 | Hagenlocher | |
| 6,604,710 B2 | 8/2003 | Ohmer et al. | |
| 6,901,967 B1 | 6/2005 | Kuenzer | |
| 7,171,792 B2 | 2/2007 | Windahl et al. | |
| 2003/0102668 A1 | 6/2003 | Tarbutton et al. | |

OTHER PUBLICATIONS

Satellite Antenna Tripod, http://www.ioffer.com/i/satellite-antenna-tripod-120736647?source=eisi listed Sep. 11, 2009.

Hy-Gain Model 105CA 5 Elements, 10 Meter Beam Instruction manual Aug. 2002.

Hy-gain DIS-72 Discoverer 7-2 40-Meter 2-Element HF Beam Instruction manual. Jan. 2003.

Hy-gain LP-1010A / LP-1010AN Log Periodic Antenna Instruction manual. Aug. 2002.

Hy-gain Model UB-7031DX 70 cm / 31 Element Yagi for SSB/CW DXing Instruction manual. Aug. 2002.

Cushcraft X7 Tribande 20-15-10 Meter Seven Element Beam Assembly and Installation Manual. Aug. 1989.

MACO M105C 5 Element- 11 Meter Maximum Beam Assembly Instructions. Mar. 1998.

Air Dynamics, Carbon Fiber Fittings. www.airdyn.com/superior/fit.htm. May 2002.

Carbon Fiber Tube Shop Cut and Bond Equipment and Instructions. http://www.carbonfibertubeshop.com/cut%20&%20bond.html. May 2009.

Tubejoiners Brochure. http://www.Tubejoiners.com. 2007.

Total Structures Brochure. http://www.totalstructures.com/techdata/pdf_datasheets/total_structures_brochure.pdf. Oct. 2006.

Splice-Locks. Alvin Products, Ltd., London, England, Nov. 1998.

Plumbing Supply PVC Fittings. http://www.plumbingsupply.com/pvc.html, 1995.

Self-Supporting and Guyed Tower Accessories, http://www.ehresmannengineering.com/self.htm, Aug. 2005.

John G. Miller, The Home Mechanics Handbook, pp. 418-423, Garden City Books, Garden City, NY 1945-1954.

* cited by examiner

Fig. 2a
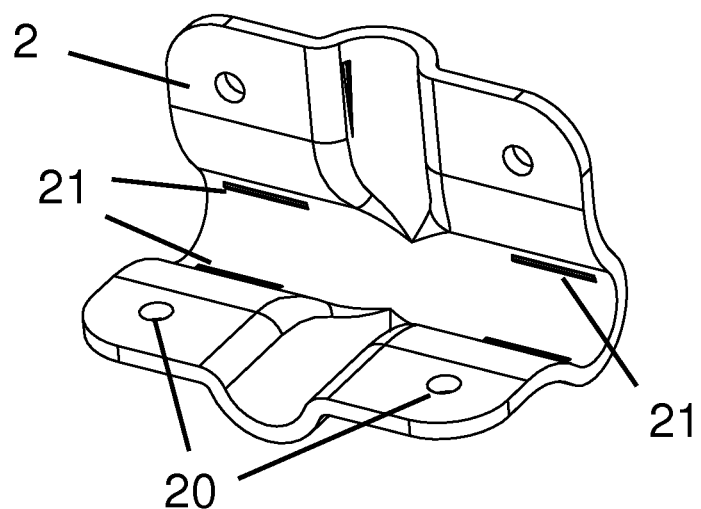
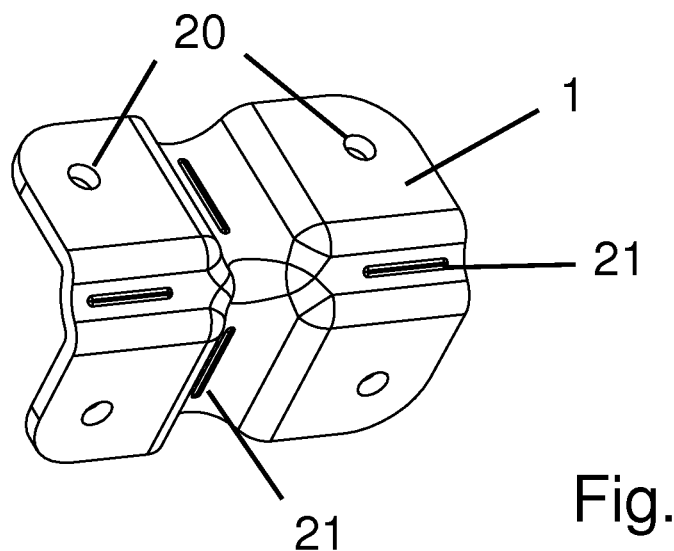
Fig. 2b

Fig. 12a
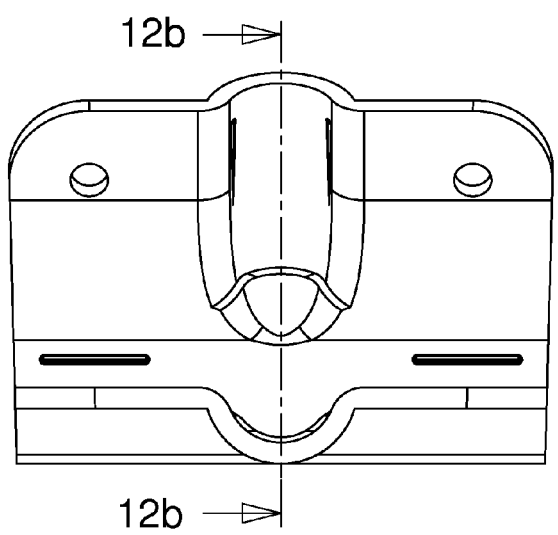
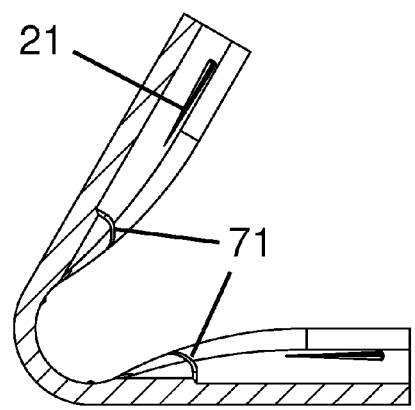
Fig. 12b

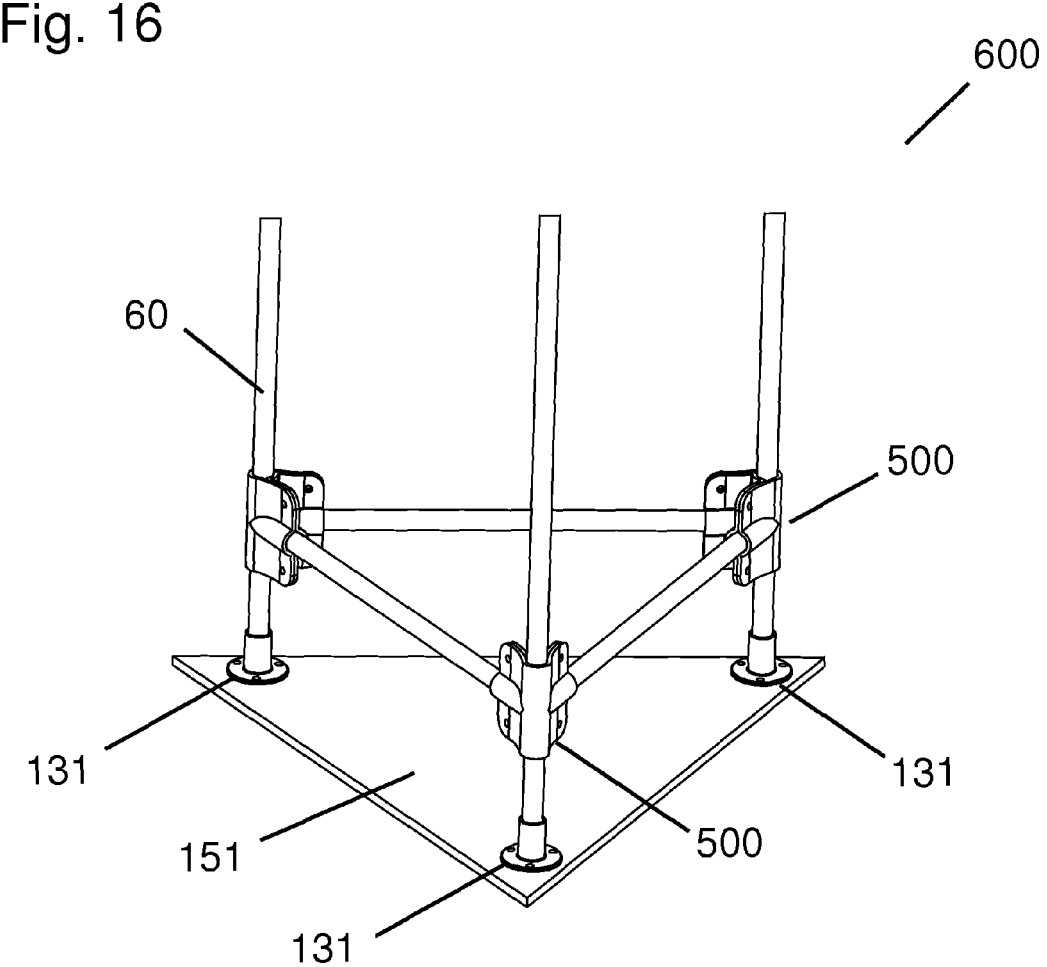

Fig. 17a
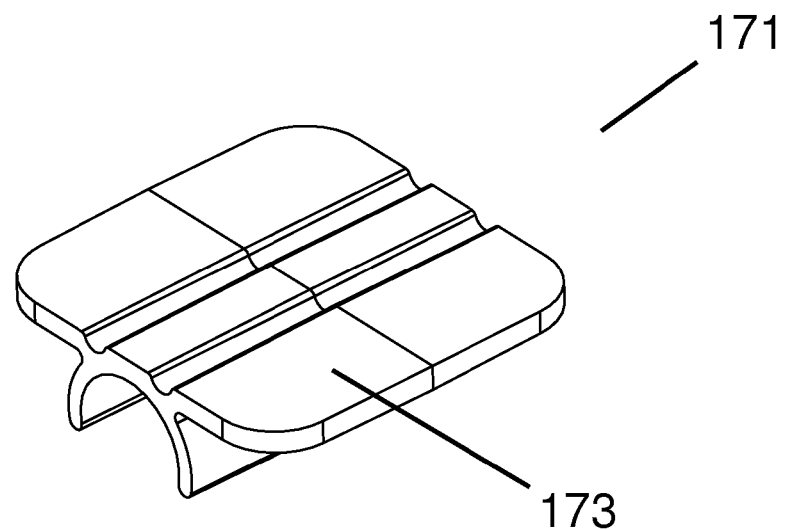
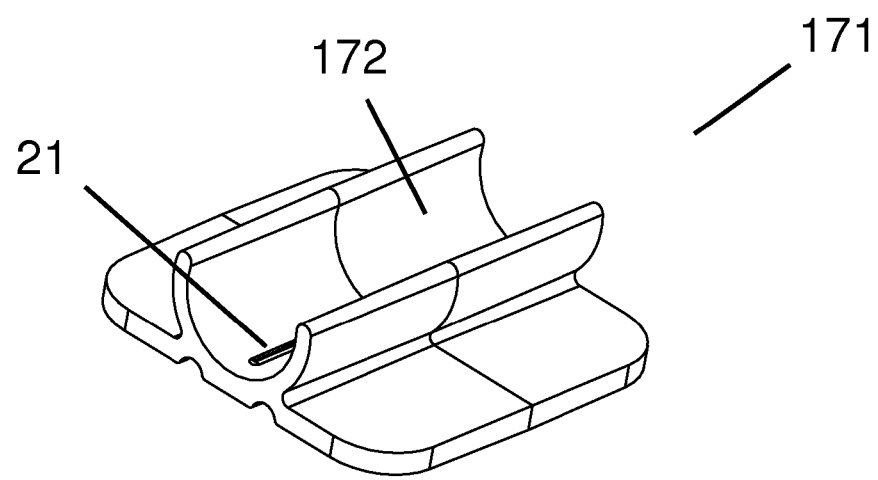
Fig. 17b

3-DIMENSIONAL UNIVERSAL TUBE CONNECTOR SYSTEM

REFERENCE TO RELATED APPLICATIONS

This application claims one or more inventions which were disclosed in Provisional Application Ser. No. 61/323,046, filed Apr. 12, 2010, entitled "3-DIMENSIONAL UNIVERSAL TUBE CONNECTOR SYSTEM". The benefit under 35 USC §119(e) of the United States provisional application is hereby claimed, and the aforementioned application is hereby incorporated herein by reference.

This application is also a continuation-in-part application of application Ser. No. 12/698,220, filed Feb. 2, 2010, entitled "3-DIMENSIONAL UNIVERSAL TUBE CONNECTOR SYSTEM", which claimed the benefit of Provisional Application Ser. No. 61/149,439, filed Feb. 3, 2009, entitled "3-DIMENSIONAL UNIVERSAL TUBE CONNECTOR SYSTEM".The aforementioned applications are hereby incorporated herein by reference.

BACKGROUND OF THE INVENTION

1. Field of the Invention

This invention relates to fabricated tubular truss and frame structures, and in particular to structures assembled using carbon-fiber tubes or rods.

2. Description of Related Art

Trusses and frame type structures have been used for many years as an efficient method to create lightweight, yet extremely stiff support structures. Trusses are particularly useful when a load must be carried over long distances, such as in building roofs, bridges, and cranes.

Prior art exists for various types of truss connector systems. U.S. Pat. No. 435,156 (Schmemann) discloses a design for an arch pipe truss for use in roofs. Schmemann uses rod members with threaded ends, which are threaded in joint connectors with mating receptacles. This design, however, does not allow the user to select the angle for the diagonal arbitrarily.

U.S. Pat. No. 2,487,169 (Newell) discloses a joint connector used for creating pipe trusses. This connector is fabricated by intersecting plates fitted axially into the pipe end. This joint must be welded together, especially for each individual joint.

U.S. Pat. No. 3,985,459 (Gilb) discloses a ridge joint connector assembly. In this joint, two pairs of sheet metal fastener plates are placed on the inside and outside faces of the ends of lumber members. This joint does not allow for the connection of tubes and rods, nor does it permit the connection of members orthogonal to the first two members. U.S. Pat. No. 4,050, 210 (Gilb) also discloses a ridge connector for light composite trusses composed of lumber top chords and metal webs. Here, pairs of U-shaped connectors are used, along with pins and slots to hold the members together.

U.S. Pat. No. 4,161,088 (Gugliotta) discloses a pipe-and-ball truss array for supporting deck surfaces. This joint includes a spherically shaped joint center, with tubular members bolted to various locations on the sphere. U.S. Pat. No. 4,915,533 (De la Haye) discloses a coupling piece for joining two or more rods. This patent uses a round or polygonal shaped piece, into which the rods are bolted at specific locations. U.S. Patent No. 5,310,273 (Hara) discloses a joint structure for removably attaching a ball member to an end of a bar to form a truss structure, which engages using a tension rod.

U.S. Pat. No. 4,650,361 (Seuster) discloses a joint for truss structures including fiber composite material. In particular, the joint attaches reflector panels in a truss support structure for a radio telescope, and the truss bars and reflector panels are made from carbon-fiber composites. Here, the joint includes a ball into which bolts are fastened, with the ends attached to the fiber composite bars.

U.S. Pat. No. 3,229,998 (Pennington), U.S. Pat. No. 4,667, 505 (Sharp), U.S. Pat. No. 4,870,856 (Sharp), U.S. Pat. No. 4,840,201(Botsolas), U.S. Pat. No. 5,007,666 (Kyfes), and U.S. Design Patent No. D362,916 (Cetrulo) disclose various types of split or clam-shell shaped joiners. These methods, however, do not incorporate means to connect diagonal connectors, and hence cannot be used exclusively to form a truss structure. Similarly, U.S. Pat. No. 6,032,430 (Soukup), U.S. Pat. No. 5,346,237 (Wang), U.S. Pat. No. 6,604,710 (Ohmer), and U.S. Pat. No. 5,711,131 (Thomas) all disclose connection methods for bars; however, in each case the directions of the individual members is predetermined by the specific connector. That is, the user needs multiple types of connectors to fabricate an entire structure with multiple internal angles.

U.S. Pat. No. 7,171,792 (Windahl et al.) discloses a pipe and cable truss system. Here, two inclined members are joined at an angle, forming the peak of the truss. Vertical members and tension cables are used to hold the structure together. In order to connect the tension cables, tabs with holes are attached to the rigid pipe members. These tabs, however, would not be adequate for high compression or out-of-plane loads. In addition, the use of tabs prohibits the attachment of tubes and rods in place of the tension cables.

Several companies offer joints for connecting tubes. Hy-Gain Corporation (Lincoln, Nebraska) manufactures antenna support structures. Hy-Gain Model LJ-105CA contains a clamshell type joint that is used to connect multiple tubes inline and at 90 degree angles. Using these connectors, however, one is unable to attach tubes along the third axis. In addition, there is no means to connect compressional diagonal members through this type of joint. Cushcraft Corporation (Manchester, New Hampshire) also supplies clamshell type attachment joints for antenna support structures (Big Thunder Series); however, like with the Hy-Gain models, a single universal joint cannot be utilized to create an entire truss or frame.

AirDynamics Corporation (New York, N.Y.) provides fittings to connect carbon fiber tubes. These fittings are tube splices used by sliding one end into each tube. Adhesive is applied to the fitting prior to insertion within the tube, and the glue line lies between the outer periphery of the fitting and the inner tube wall.

SUMMARY OF THE INVENTION

A system connects uni-directional pultruded, filament wound, or roll-wrapped tubes or rods together to form trusses and other structures using a series of connector pieces bonded together. The tubes or rods are preferably carbon fiber tubes or rods. The connector pieces are preferably bonded together with adhesive. In one embodiment, the adhesive is an epoxy adhesive.

A universal joint connector allows simple, easy, and inexpensive fabrication of complex structures from pultruded, filament wound, or roll-wrapped carbon-fiber tubes or rods. This method is applicable to all types of materials for both the tubes and rods, as well as the connectors; however, the preferred embodiment uses pultruded, filament wound, or roll-wrapped carbon fiber tubes and/or rods and injection molded carbon-fiber reinforced plastic connectors. The universal connectors are preferably fabricated from three parts: an outer piece, an inner piece, and preferably one to four diagonal tube connectors.

In one embodiment, a connector system includes tubes or rods and universal connectors. Each universal connector includes a first connector bracket and a second connector bracket, where the first connector bracket and the second connector bracket attach together to form a structure having at least one opening into which the tubes or rods can be placed. The universal connector also includes at least one diagonal member having an opening into which a tube or rod can be placed. The diagonal member is aligned at an angle in relation to at least one of the openings in the structure. The universal connector also includes adhesive ridge gauges on an inner surface of the opening of the diagonal member and in the opening of the structure.

In another embodiment, a universal connector includes a first connector bracket and a second connector bracket, where the first connector bracket and the second connector bracket attach together to form a structure having at least one opening into which the tubes or rods can be placed. The universal connector also includes at least one diagonal member having an opening into which a tube or rod can be placed. The diagonal member is aligned at an angle in relation to at least one of the openings in the structure. The universal connector also includes adhesive ridge gauges on an inner surface of the opening of the diagonal member and in the opening of the structure.

In yet another embodiment, a truss structure includes universal connectors. The universal connectors each include a first connector bracket and a second connector bracket, where the first connector bracket and the second connector bracket attach together to form a structure having at least one opening into which the tubes or rods can be placed. The universal connector also includes at least one diagonal member having an opening into which a tube or rod can be placed. The diagonal member is aligned at an angle in relation to at least one of the openings in the structure. The truss structure also includes tubes or rods, which are connected by the universal connectors to form longitudinal members, a plurality of cross-members orthogonal to the longitudinal members, and a plurality of diagonal elements connecting the longitudinal members on a diagonal.

A method constructs a truss structure from tubes or rods and universal connectors. Each universal connector includes a first connector bracket and a second connector bracket, where the first connector bracket and the second connector bracket attach together to form a structure having at least one opening into which the tubes or rods can be placed. The universal connector also includes at least one diagonal member having an opening into which a tube or rod can be placed. The diagonal member is aligned at an angle in relation to at least one of the openings in the structure. The method includes the step of forming longitudinal members by connecting the tubes or rods linearly with universal connectors. The method also includes the steps of connecting the longitudinal members with a plurality of cross-members using universal connectors such that the cross-members are orthogonal to the longitudinal members and bracing the truss structure by connecting a plurality of diagonal elements on two different longitudinal members and two different cross-members using universal connectors.

BRIEF DESCRIPTION OF THE DRAWINGS

FIG. 2a shows an outer connector bracket of the universal connector of FIG. 1.

FIG. 2b shows an inner connector bracket of the universal connector of FIG. 1.

FIG. 6b shows a back side view of the assembled 90 degree angle universal connector shown in FIG. 6a.

FIG. 12a shows a portion of the outer connector bracket of FIG. 11.

FIG. 12b shows a cross-sectional view along lines 12b-12b of FIG. 12a, through the midplane of the outer connector bracket of FIG. 11, showing the tube stop feature.

FIG. 16 shows a close-up view of the end of the structure shown in FIG. 15, showing the plate and tube end connectors.

FIG. 17a shows a tube side connector of the present invention.

FIG. 17b shows another view of the tube side connector of FIG. 17a.

FIG. 19b shows another view of the truss structure of FIG. 19a.

FIG. 20b shows the outer portion of the 3-way connector of FIG. 20a.

FIG. 20c shows the inner portion of the 3-way connector of FIG. 20a.

FIG. 22a shows a 2-dimensional T connector of the present invention.

FIG. 22b shows an exploded view of the two brackets that make up the T connector of FIG. 22a.

FIG. 24a shows a 2-dimensional 90 degree connector of the present invention.

FIG. 24b shows an exploded view of the two brackets that form the connector of FIG. 24a.

FIG. 26a shows a 2-dimensional 135 degree connector of the present invention.

FIG. 26b shows an exploded view of the two brackets that form the connector of FIG. 26a.

FIG. 28a shows an inline connector of the present invention.

FIG. 28b shows an exploded view of the two brackets that form the connector of FIG. 28a.

FIG. 29a shows a 2-dimensional 4-way connector of the present invention.

FIG. 29b shows an exploded view of the two brackets that form the connector of FIG. 29a.

FIG. 32b shows a front side view of the 90 degree universal connector of FIG. 32a.

FIG. 34b shows a front side view of the 60 degree universal connector of FIG. 34a.

FIG. 39 shows an alternate embodiment for the inline connector of FIG. 38a.

FIG. 43b shows an inner view of the 3-dimensional 90 degree universal connector piece of FIG. 43a.

FIG. 46b shows an alternate view of the connector of FIG. 46a.

DETAILED DESCRIPTION OF THE INVENTION

The present invention includes a system for connecting tubes or rods together to form trusses and other structures using a series of connector pieces bonded together. Either tubes or rods, or any combination of both tubes and rods, may be used in the connector system of the present invention. The connector system of the present invention is preferably designed for uni-directional pultruded, filament wound (fiber wound), or roll-wrapped tubes or rods. In a preferred embodiment, the tubes or rods are made of carbon fiber. Carbon-fiber products, such as carbon-fiber tubes or rods, can be used for a wide range of applications. There is great interest in purchasing these raw building materials and using them to fabricate custom structures.

In a preferred embodiment, the connectors and the tubes or rods form a truss structure. The connector pieces are preferably bonded together with adhesive. In one embodiment, the adhesive is an epoxy adhesive.

A universal joint connector allows simple, easy, and inexpensive fabrication of complex structures from tubes or rods. This method is applicable to all types of materials for both the tubes and rods, as well as the connectors; however, the preferred embodiment uses pultruded, filament wound, or roll-wrapped carbon fiber tubes/rods and injection molded carbon-fiber reinforced plastic connectors.

The present invention includes a universal joint for constructing trusses, where the diagonals can be set at any angle, and the diagonal members can be either in tension or compression. In preferred embodiments, the diagonal members are tubes. A single joint can be used to construct an entire truss or frame structure out of tubes or rods, regardless of the size and diagonal angles. In other words, one only needs to design the shape of the truss and not any individual connectors.

Unlike prior art brackets, which can only connect elements in one plane, the present invention includes a method and system for connecting a tube or rod out of plane (that is, perpendicular to the two in-plane directions). Also unlike the prior art, the connectors of the present invention can connect the tubes or rods at any angle, giving a high degree of versatility to a single connector design. When constructing a truss structure, both of these connection methods preferably need to be utilized. The third dimension gives the truss both depth and width, and the diagonal members are necessary for rigidity due to shear and torsional loads.

While screws or other fasteners are used in the present invention, they are preferably used to simply hold the part together during bonding. All of the strength preferably comes from an adhesive bond.

The universal connector is preferably fabricated from three parts: an outer piece (outer connector bracket), an inner piece (inner connector bracket), and one or more diagonal tube connectors (diagonal members). In preferred embodiments, there are one to six diagonal members.

Figure 1:
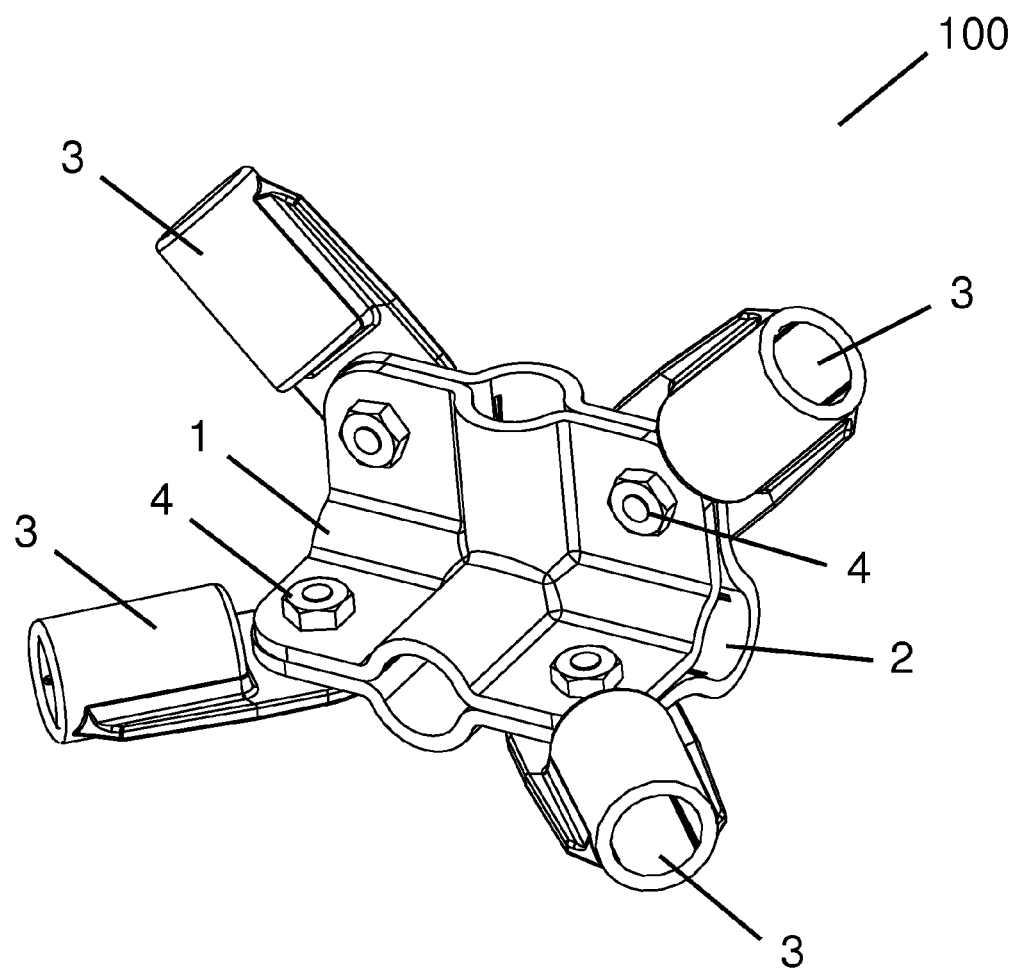
FIG. 1 shows an assembled 90 degree angle universal connector with 4 diagonal members attached in an embodiment of the present invention.

An embodiment of the present invention is shown in FIG. 1, which depicts an assembled 90 degree angle universal connector 100. The universal connector 100 includes an inner connector bracket 1 and an outer connector bracket 2 that form a clamshell. Since diagonal elements are an integral part of most truss structures, this capability is preferably added to the design through an additional diagonal member 3. The diagonal member 3 is shown in FIG. 1 secured in place by adhesive; however, there are other ways of securing the diagonal member 3 including, but not limited to, fasteners, clips and weldments. In order to facilitate ease of assembly and proper pressure during adhesive curing, a fastener 4 is preferably used.

The outer connector bracket 2 and the inner connector bracket 1 are shown separated in FIGS. 2a and 2b, respectively. The holes 20 located on the flat surfaces are used to align the parts correctly during assembly and bonding. In preferred embodiments, fasteners 4, shown in FIG. 1, for example rivets, screws, or bolts with nuts, are placed through the holes to align the parts and draw them together for proper bonding. If screws are used, then one connector piece would include a through hole, and the other piece would include a tapped hole. The fastener is inserted during bonding, and can optionally be removed once the adhesive is fully cured.

Figure 3:
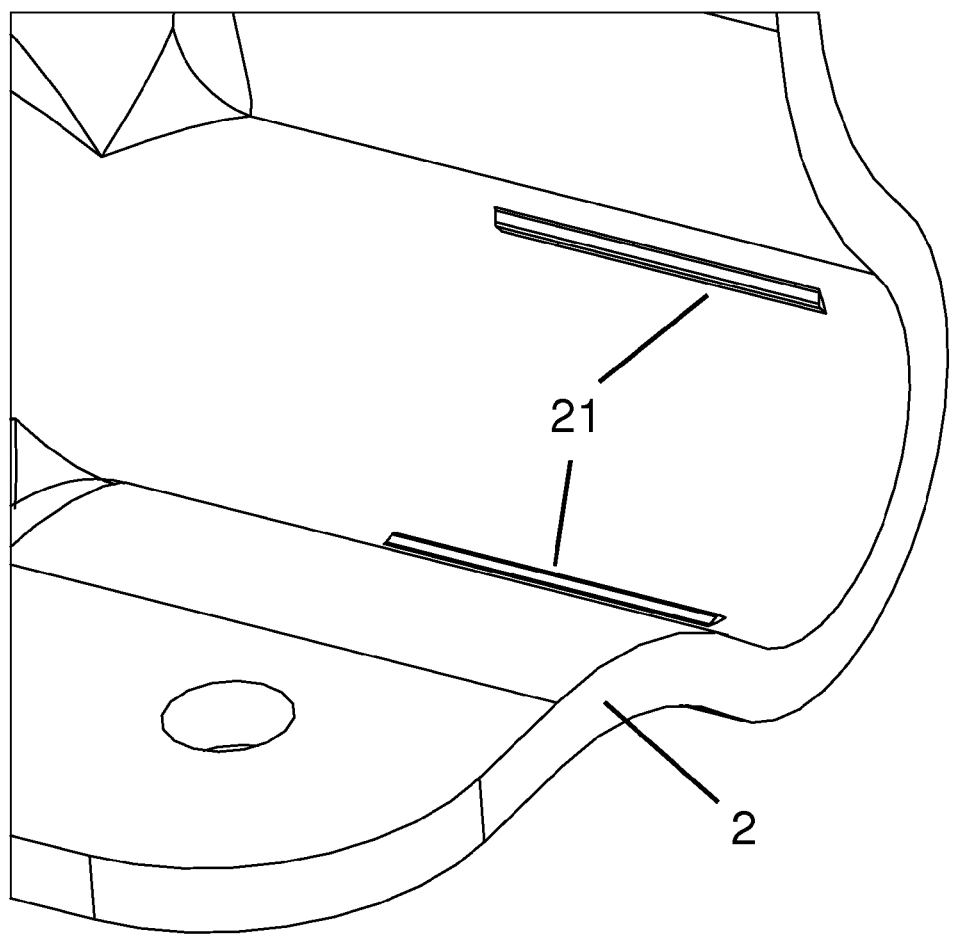
FIG. 3 shows a close-up of the outer connector bracket of FIG. 2a, including adhesive ridge gauges.

Adhesive ridge gauges, or ribs, 21, preferably located on the interior surfaces of the connector brackets 1 and 2, help to properly align the tubes or rods, as well as provide proper spacing between the wall surfaces to ensure adequate adhesive thickness. FIG. 3 shows a close-up of the outer connector bracket 2 and the adhesive ridge gauges 21.

Figure 4:
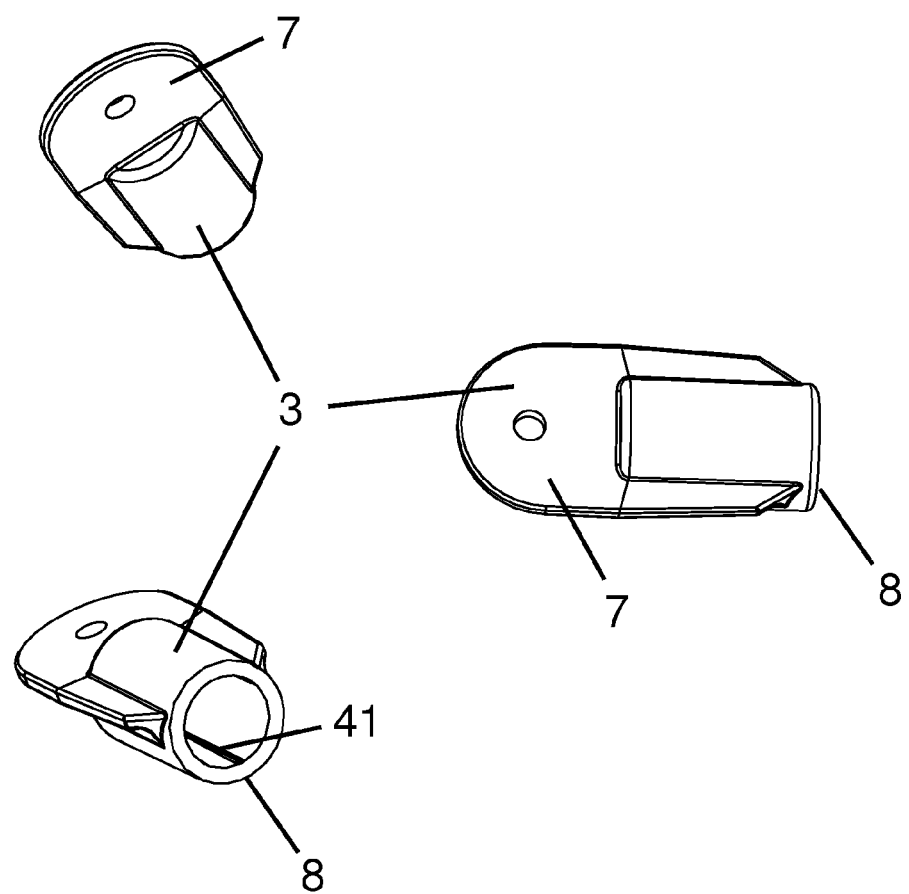
FIG. 4 shows diagonal members of FIG. 1 in various orientations.
Figure 5:
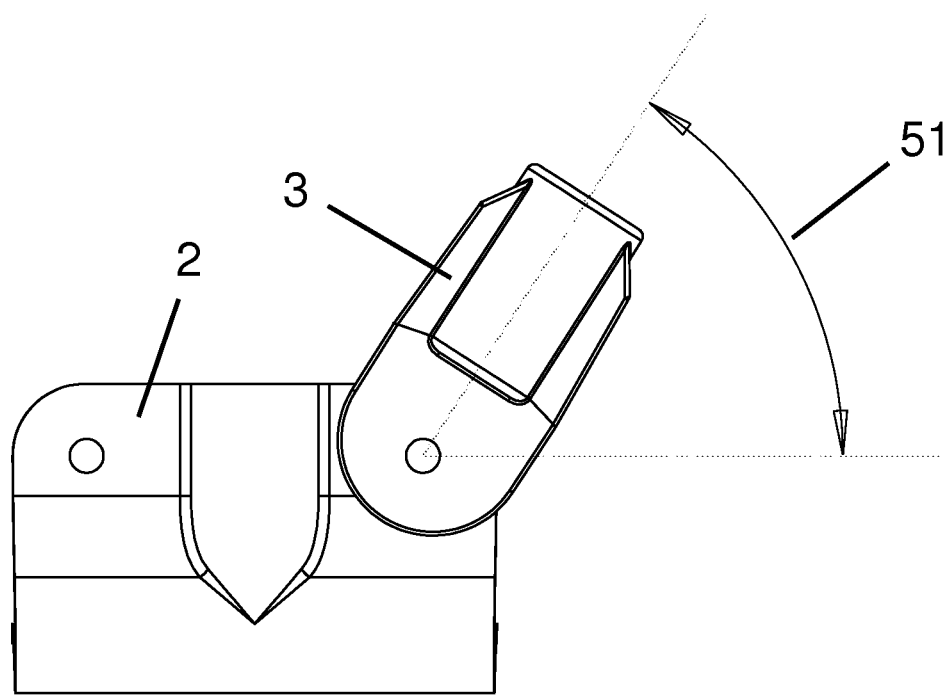
FIG. 5 shows a diagonal member attached to an outer connector bracket at an arbitrary angle.

Diagonal members 3 are shown in various orientations in FIG. 4. Each diagonal member 3 includes a tab 7 and a receptacle 8. Like with the inner connector bracket 1 and the outer connector bracket 2, adhesive ridge gauges 41, or ribs, are preferably included on the inner surfaces of the diagonal members for proper tube or rod alignment and to ensure adequate adhesive thickness.

An important feature of this design is the ability to align the diagonal members 3 at any angle 51, since this angle is not pre-determined In other words, the determination of the diagonal angle can be made by the fabricator when bonding the diagonal member 3 to the inner connector bracket 1 and the outer connector bracket 2. Eliminating design restrictions on this angle in turn removes geometric restrictions on the assembled structure. For example, if the connector angle 51 was restricted to 45 degrees, the user would be required to design the complete truss or frame structure to include only this angle, which would severely limit the use of the system. The ability to allow angle 51 to vary between 0 and 90 degrees allows the designer great latitude in truss construction.

Figure 6A:
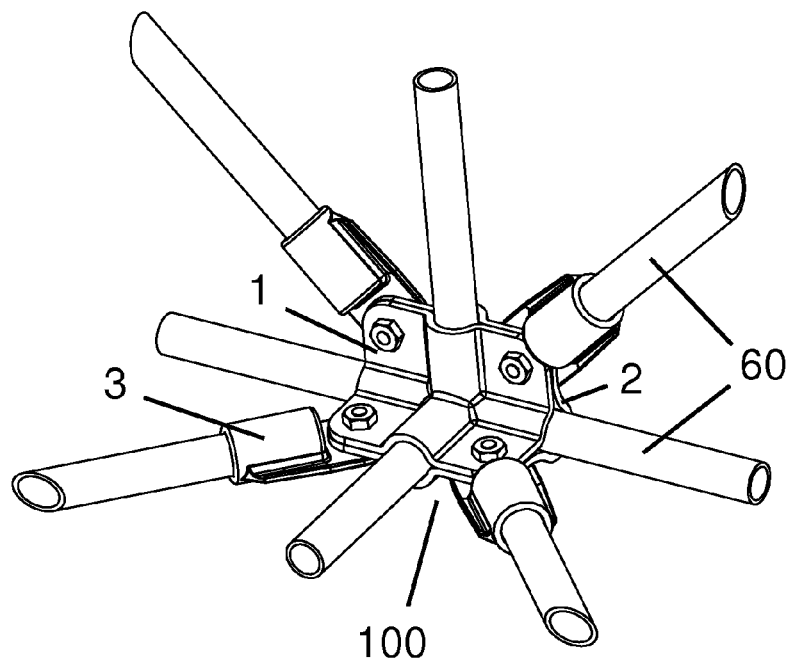
FIG. 6a shows a front side view of an assembled 90 degree angle universal connector with four diagonal members attached and tubes bonded into place.
Figure 6B:
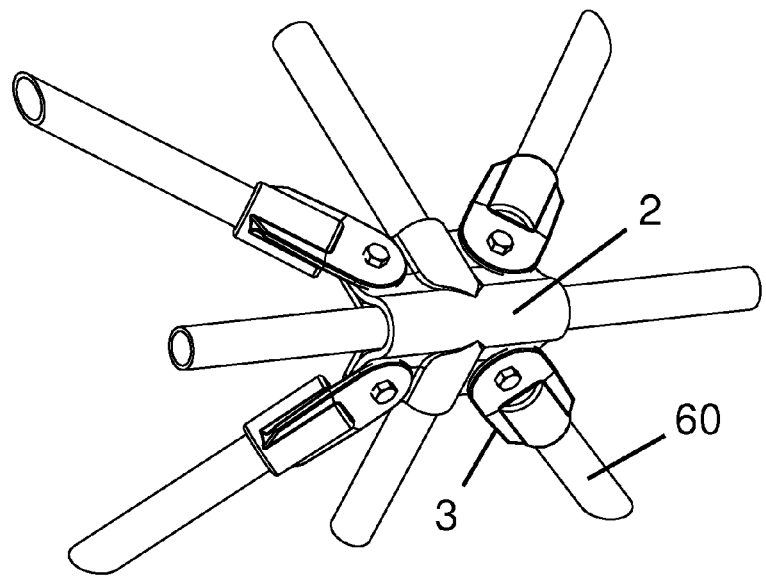
Figure 7:
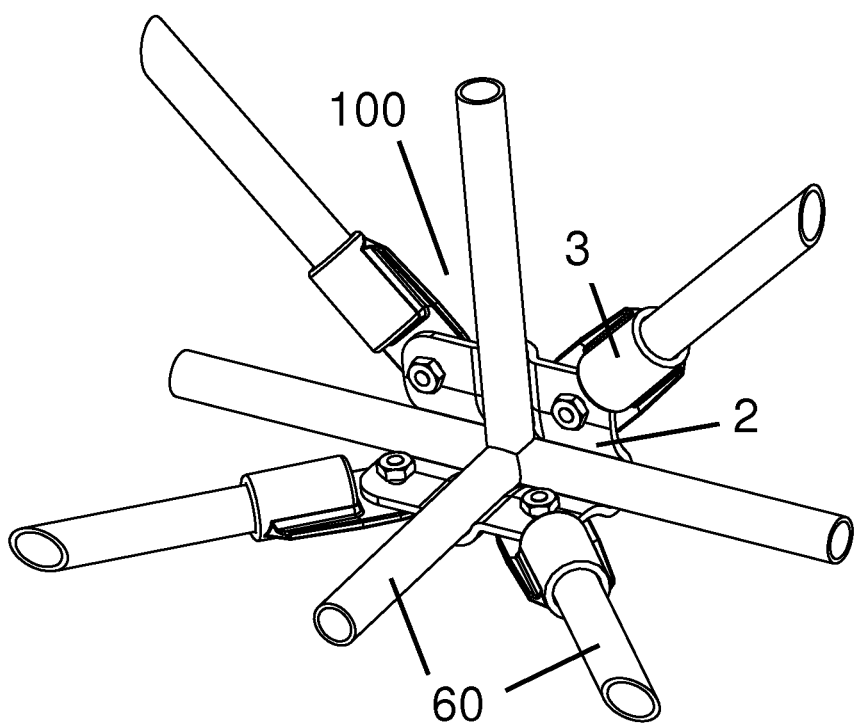
FIG. 7 shows the universal connector of FIGS. 6a and 6b with the inner connector bracket hidden.

The universal connector 100 is shown in FIGS. 6a and 6b with carbon-fiber tubes 60 inserted and bonded into place. Although tubes are shown, carbon fiber rods or other tubes or rods could alternatively be used. The user bonds a tube or rod into the diagonal member 3 by either sliding it in or placing it first into the outer connector bracket 2, and then fixing the inner connector bracket 1 into place. Adhesive is preferably added to all mating surfaces, and the tubes or rods are then placed in the requisite channels. In one embodiment, the adhesive is an epoxy adhesive. The combination of the two-piece configuration, the internal adhesive-control ridges/ribs, diagonal members, and the holes for fasteners, make up the primary gusset assembly system. The connector system is shown in FIG. 7 with the inner connector bracket 1 hidden.

Figure 8:
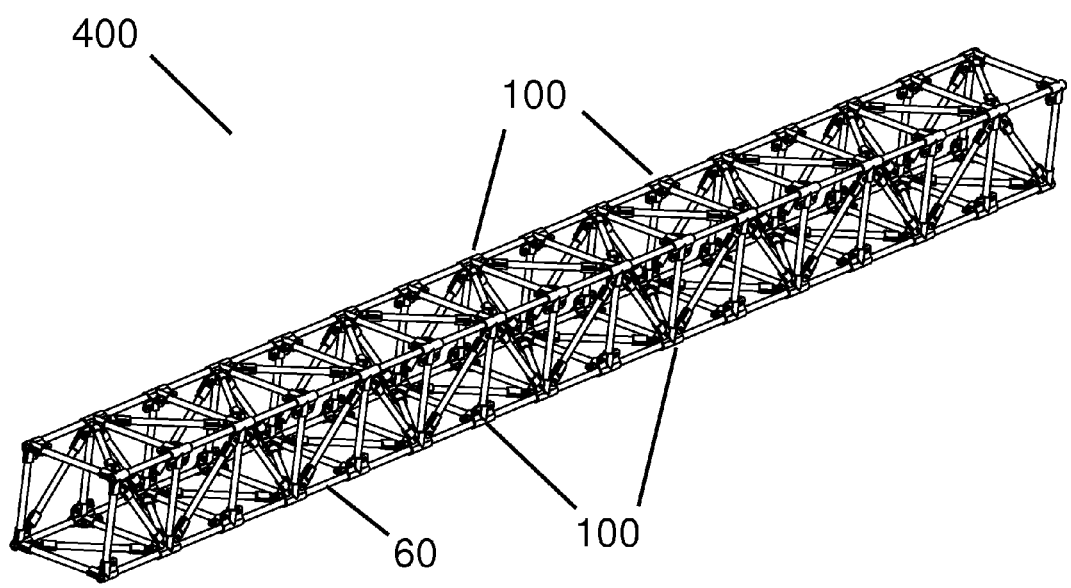
FIG. 8 shows a rectangular truss made from tubes and universal tube connectors.
Figure 9:
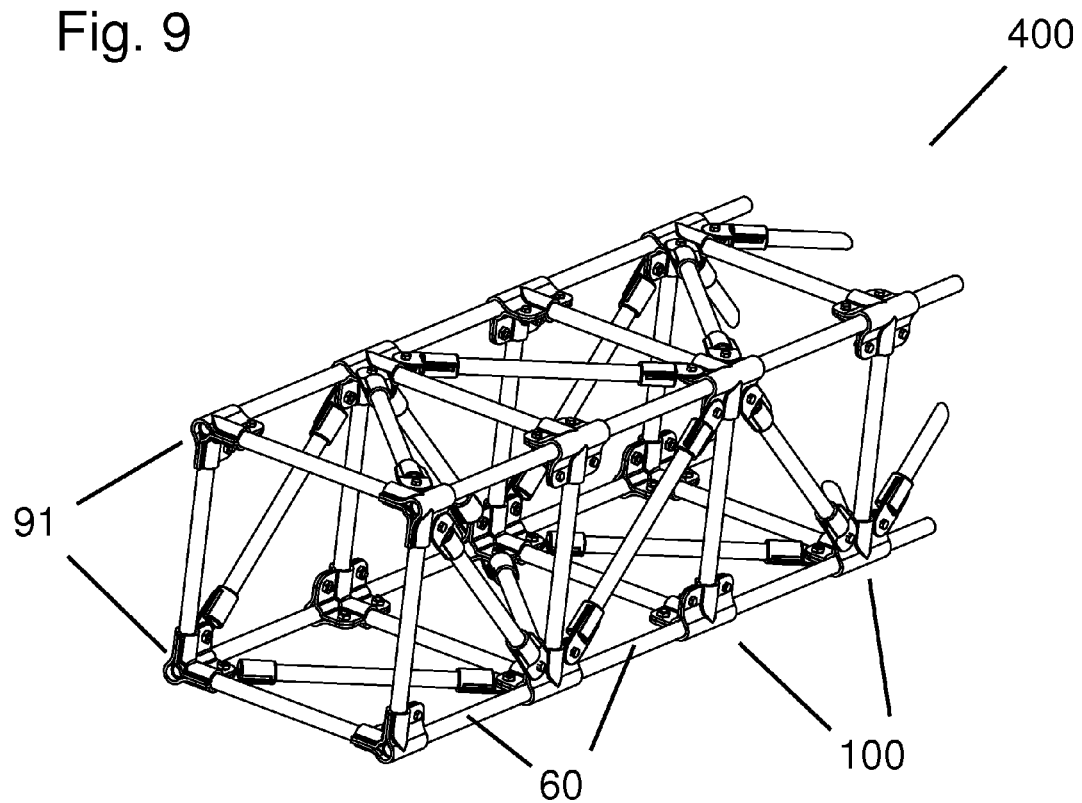
FIG. 9 shows a close-up of one end of the truss structure of FIG. 8.

An assembled rectangular truss structure 400 is shown in FIG. 8. The truss is made up of universal connectors 100 and tubes or rods 60. The tubes or rods are preferably made of carbon fiber. A close-up of one end of the truss structure 400 is shown in FIG. 9. The corner brackets 91 at the terminal end of the truss structure 400 are preferably made by cutting one leg off of the inner connector bracket 1 and the outer connector bracket 2.

Figure 10A:
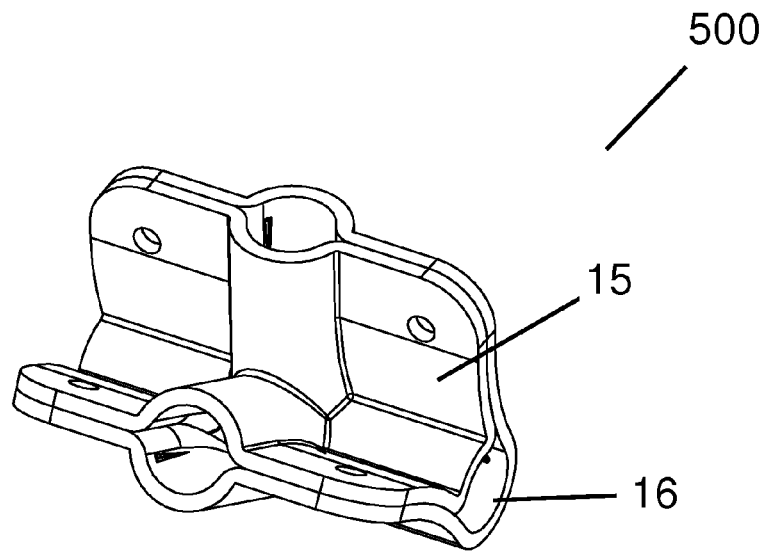
FIG. 10a shows a top down view of a 60 degree angle connector of the present invention.
Figure 10B:
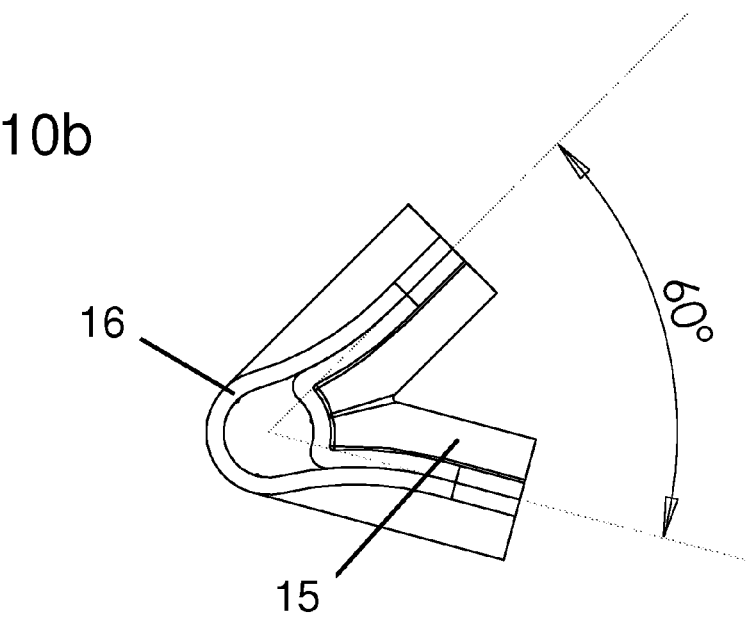
FIG. 10b shows a cross-sectional side view of a 60 degree angle connector of the present invention.

The inner connector bracket 1 and the outer connector bracket 2 can be manufactured in different shapes to facilitate creation of other truss geometries, and are not restricted to purely 90 degree connectors. One example of non-right angle connector geometries is shown in FIGS. 10a and 10b, which show a 60 degree angle connector 500. The 60 degree angle connector 500 is made up of an inner connector bracket 15 and an outer connector bracket 16. The two pieces form a clamshell structure, and allow for diagonal members 3 to be added in the same manner as shown in FIG. 1.

Figure 11:
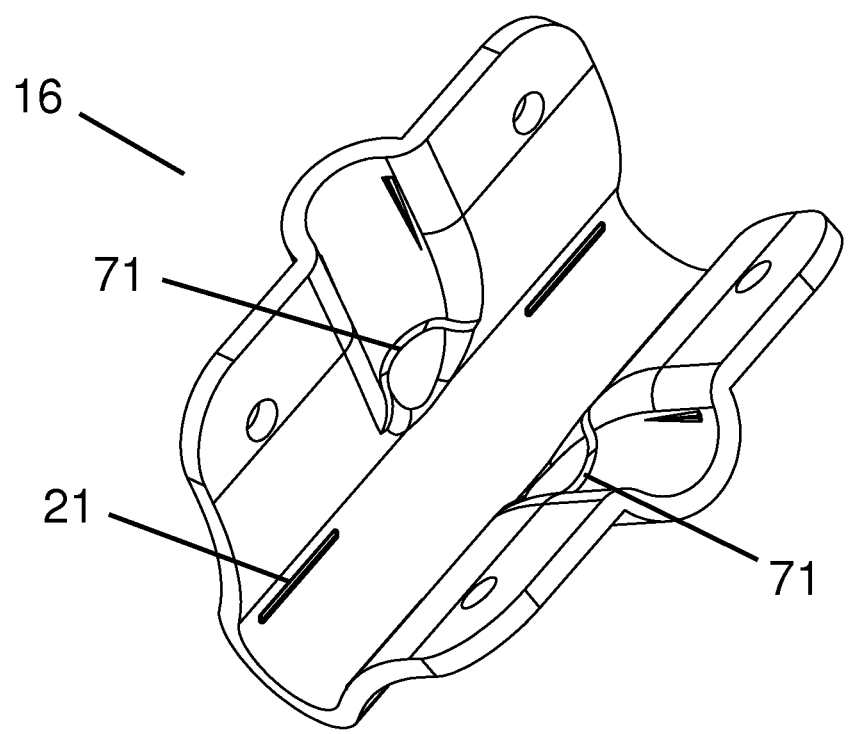
FIG. 11 shows the outer connector bracket of the 60 degree angle connector of FIG. 10.

FIGS. 11 and 12a show the inside surfaces of the outer connector bracket 16 of the 60 degree angle connector 500. Internal ribs 21 are included, similar to those in the universal connector 100, for proper tube or rod positioning and adhesive thickness control. In addition, tube stops 71 are preferably included in the connector 500 to make sure the two tubes that make the 60 degree angle are set at the proper depth. FIG. 12b shows a section view along lines 12b-12b of FIG. 12a, showing the tube stops 71 and internal ribs 21.

Figure 13:
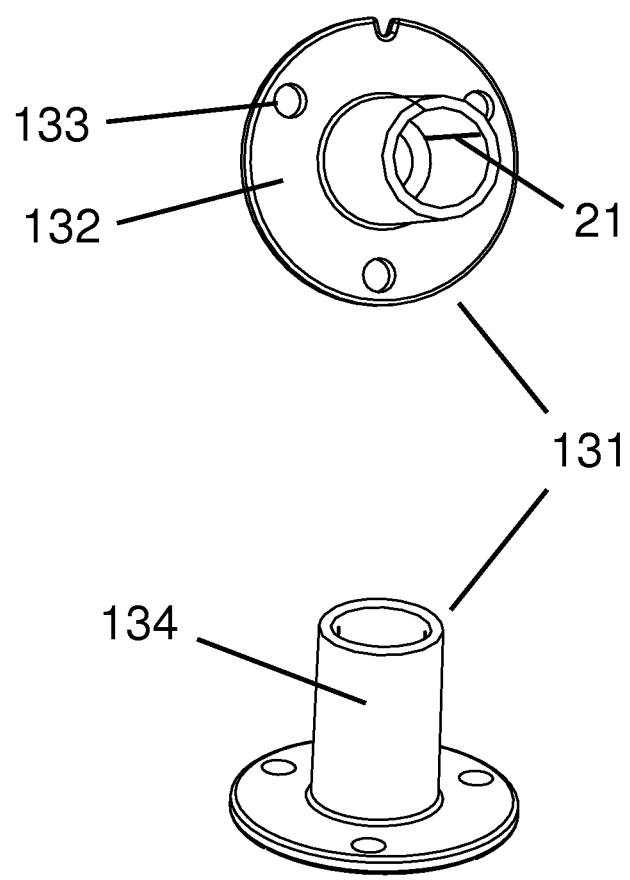
FIG. 13 shows a tube end connector of the present invention.

To facilitate the attachment of truss structures to foundations, as well as add mounting plates to the ends of the truss, a tube end connector 131, as shown in FIG. 13, can be utilized. The tube end connector 131 has a flange portion 132, holes for mounting fasteners 133, and a tubular portion 134 to accept a tube or rod, which is preferably a carbon-fiber pultruded or filament wound tube or rod.

Figure 14:
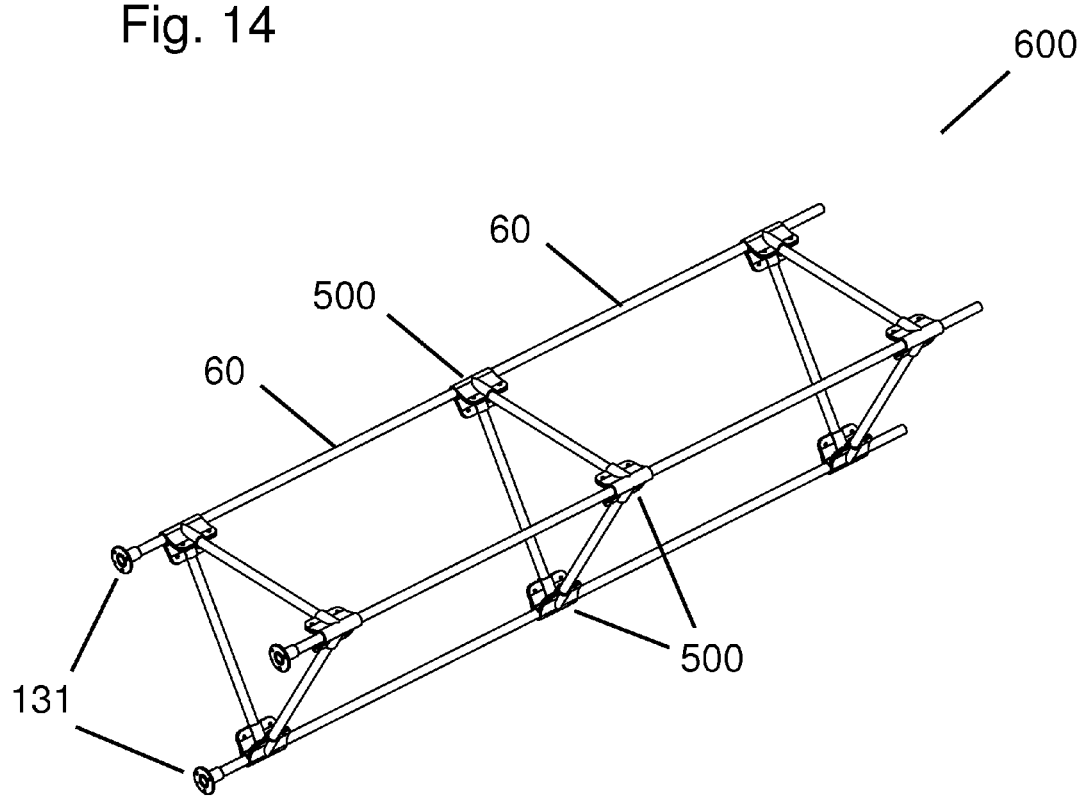
FIG. 14 shows a triangular truss including the 60 degree angle connectors of FIG. 10 and the tube end connectors of FIG. 13.
Figure 15:
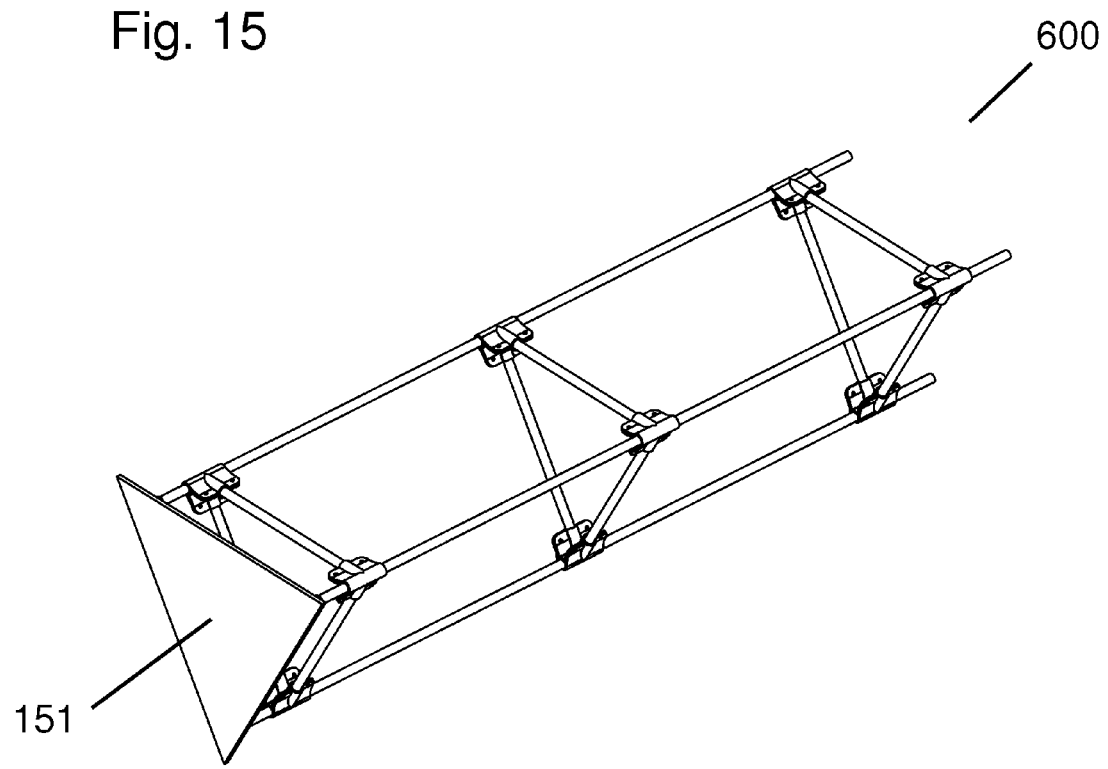
FIG. 15 shows the structure of FIG. 14 with a triangular plate bonded to the tube end connectors of FIG. 13.

FIG. 14 shows a triangular truss 600 with 60 degree angle universal connectors 500, tubes or rods 60, and tube end connectors 131. FIG. 15 shows a plate 151 optionally bonded to the tube end connectors 131 of the truss structure 600. FIG. 16 shows an alternate view of the end of the truss structure 600 of FIG. 15.

Figure 18:
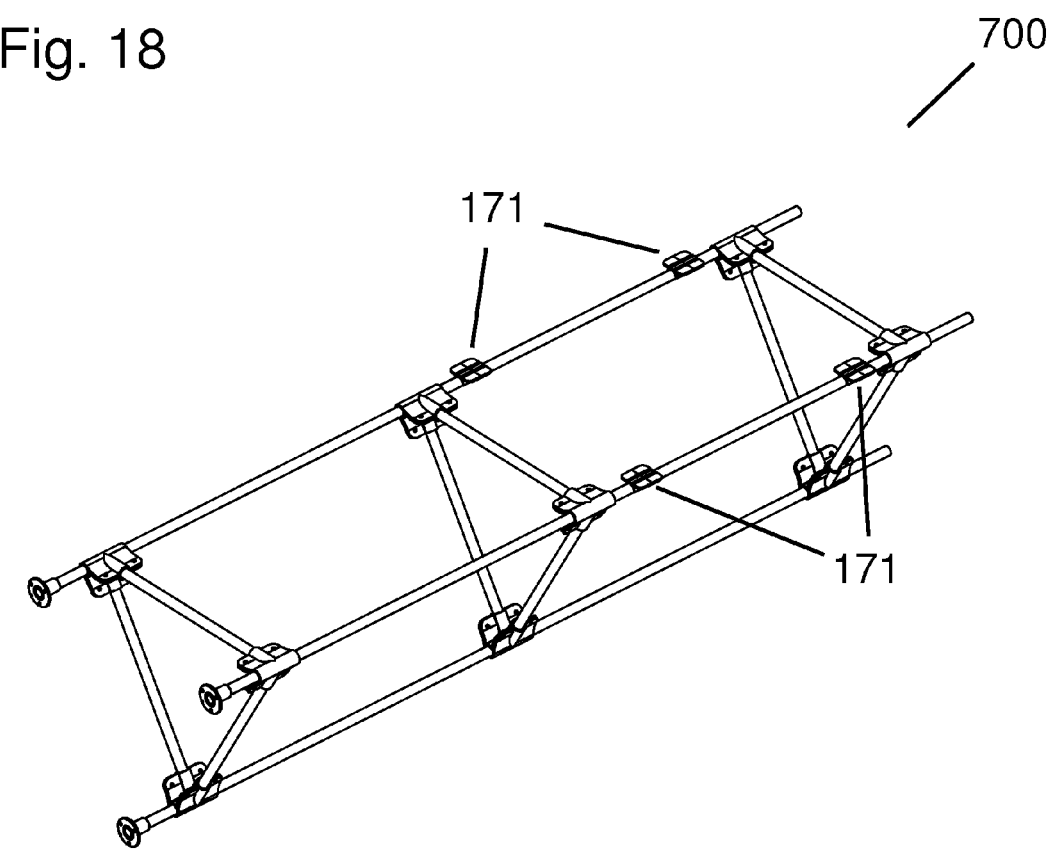
FIG. 18 shows a truss structure with tube side connectors bonded into place.
Figure 19A:
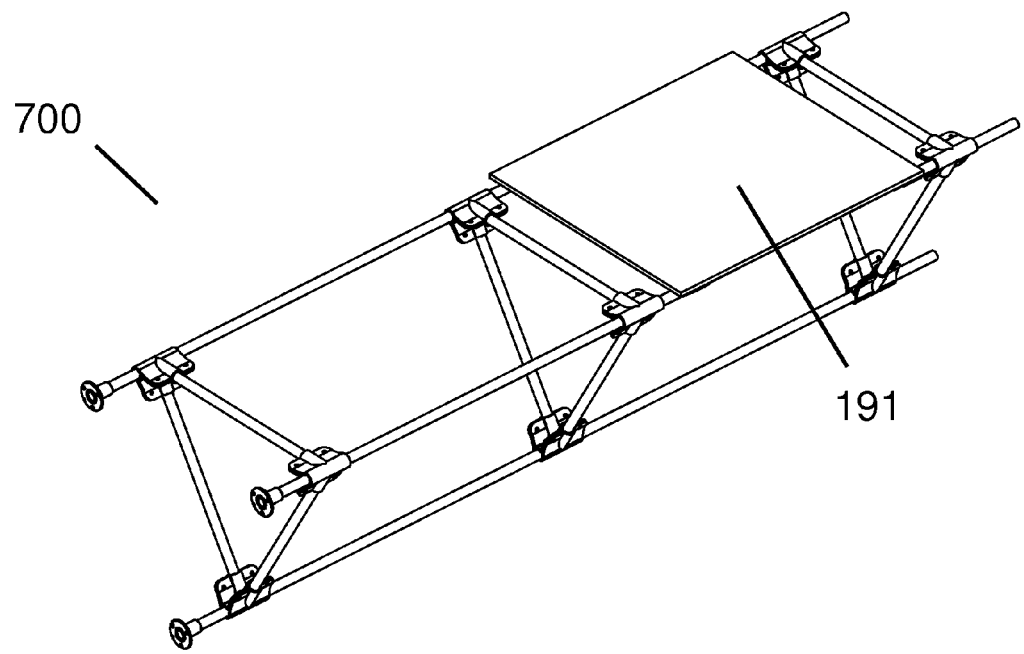
FIG. 19a shows the truss structure of FIG. 18 with a rectangular plate bonded to the tube side connectors.
Figure 19B:
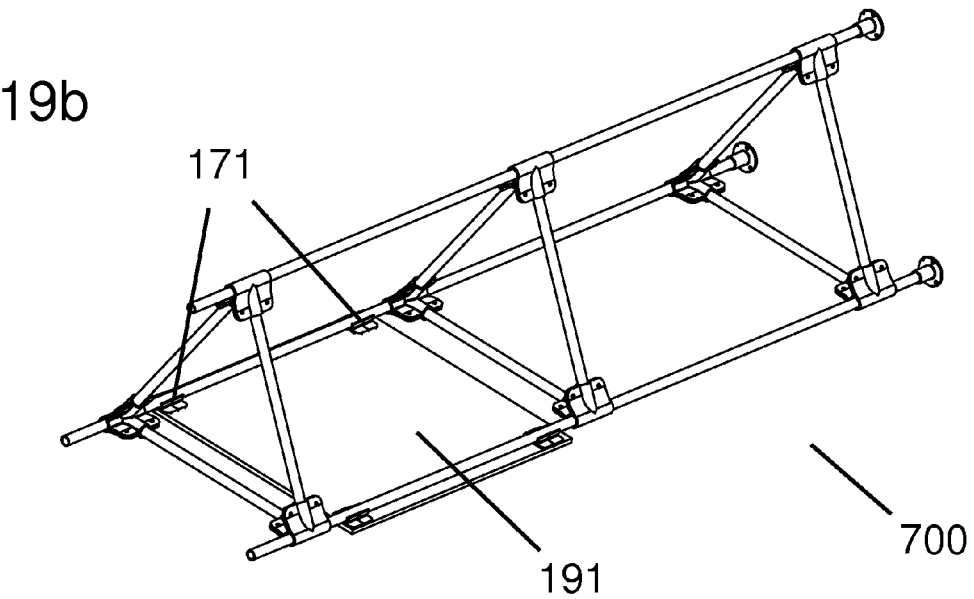

In addition to the tube end connectors, other mounting pieces can be optionally added to the truss structures. One example is a tube side connector 171 shown in FIGS. 17a and 17b. This connector includes a semi-circular channel 172, one or more internal ribs 21, and a flat side 173. The tube side connector 171 is preferably included in a truss or frame structure by bonding a tube or rod, which is preferably a carbon-fiber tube or rod, into the semi-circular channel 172 and using the flat side 173 for bonding to a support structure or for affixing a mounting plate to the truss. One example of the tube side connector included in a truss structure 700 is shown in FIG. 18. FIGS. 19a and 19b show the truss structure 700 with a flat plate 191 optionally bonded to the tube side connectors.

The universal connector can be cut at various positions in order to form simpler connectors. For example, the flange in the third dimension can be removed to form a 2-dimensional T-shaped connector. Similarly, both 2-dimensional and 3-dimensional corner pieces, as well as 2-dimensional straight splice connectors, can be formed using the same method. In this way, the universal connector assembly can be utilized for virtually any type of structural joint including, but not limited to, 2-dimensional, 3-dimensional, corner, T-shape, and diagonal angles.

Figure 20A:
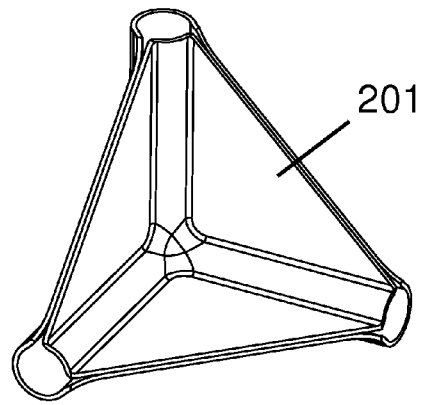
FIG. 20a shows a 3-way 90 degree connector of the present invention.
Figure 20B:
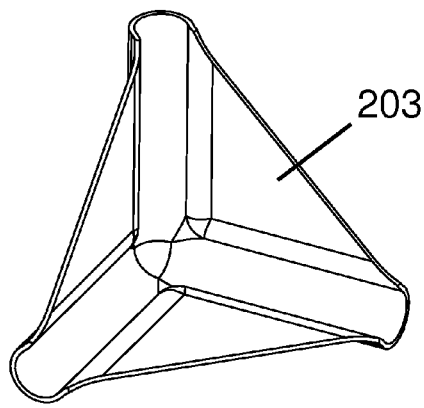
Figure 20C:
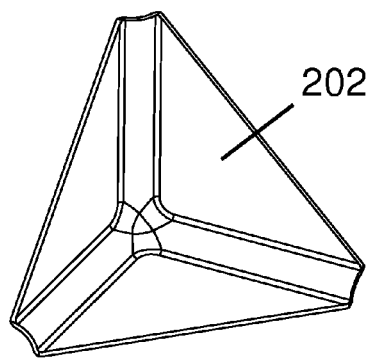
Figure 21:
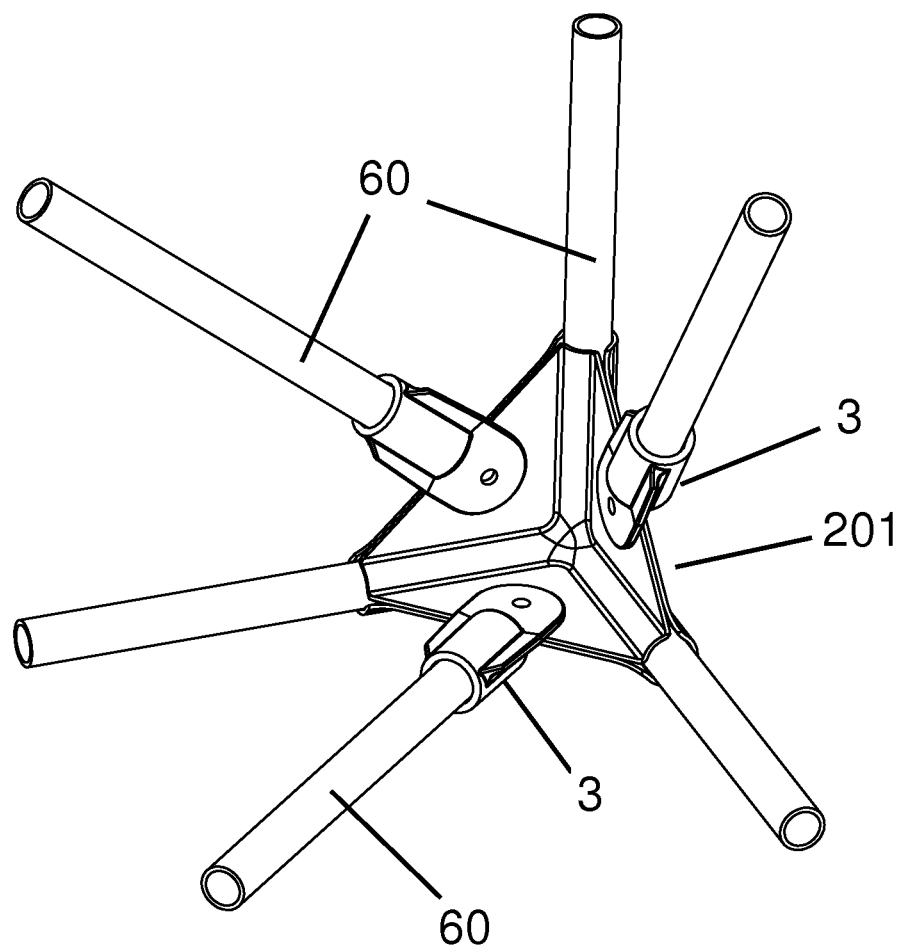
FIG. 21 shows a 3-way 90 degree connector with diagonal members and tubes or rods bonded in place.

Individual connectors for each type of joint can also be manufactured for end-users who do not wish to cut down the universal connector. A sampling of some of these simplified connectors is shown in FIGS. 20 through 31. FIGS. 20a through 20c show a 3-dimensional corner bracket connector 201. The inner connector bracket 202 and the outer connector bracket 203 are utilized using the aforementioned methods for the universal connector 100. The 3-dimensional corner bracket connector 201 is shown in FIG. 21 with three diagonal members 3 bonded into place at arbitrary angles. Also, six tubes 60 are shown bonded into the connectors 201.

Figures 22A, 22B:
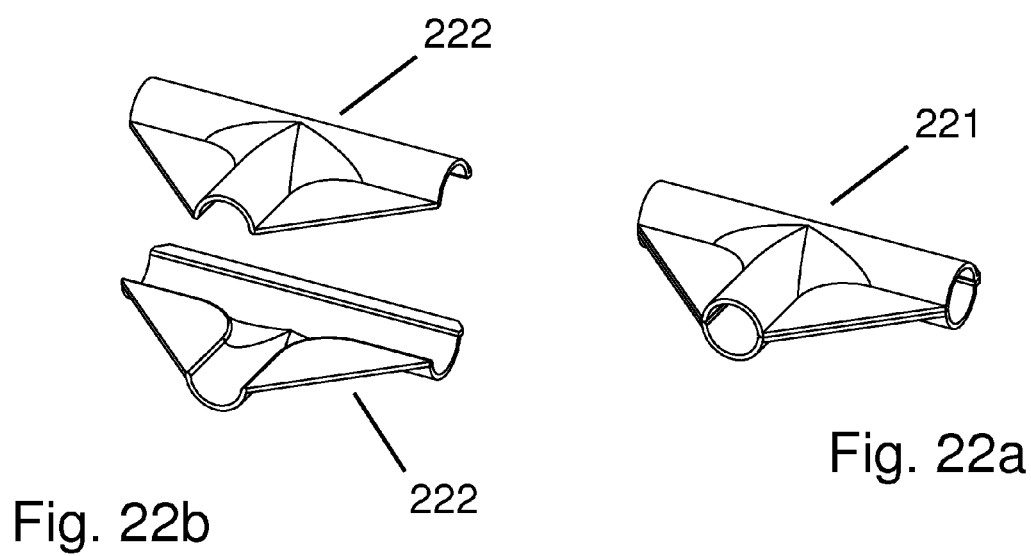
Figure 23:
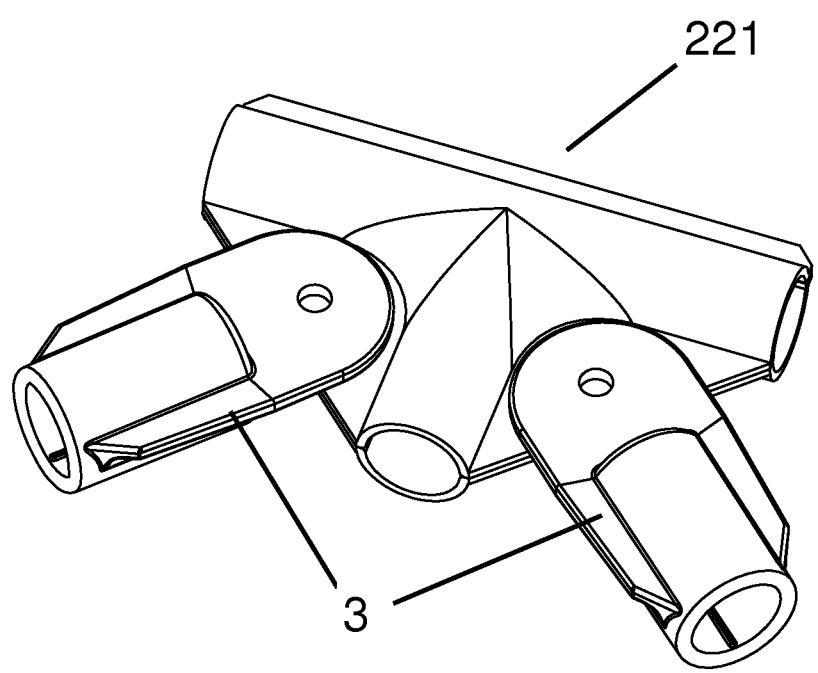
FIG. 23 shows a 2-dimensional T connector of FIG. 22 with diagonal members bonded in place.

FIGS. 22a and 22b show a 2-dimensional T connector 221. Due to symmetry, both the top 222 and bottom 222 halves of the clamshell which make up the T connector 221 are identical. The complete 2-dimensional T connector 221 is shown in FIG. 23 with two diagonal members 3 attached.

Figures 24A, 24B:
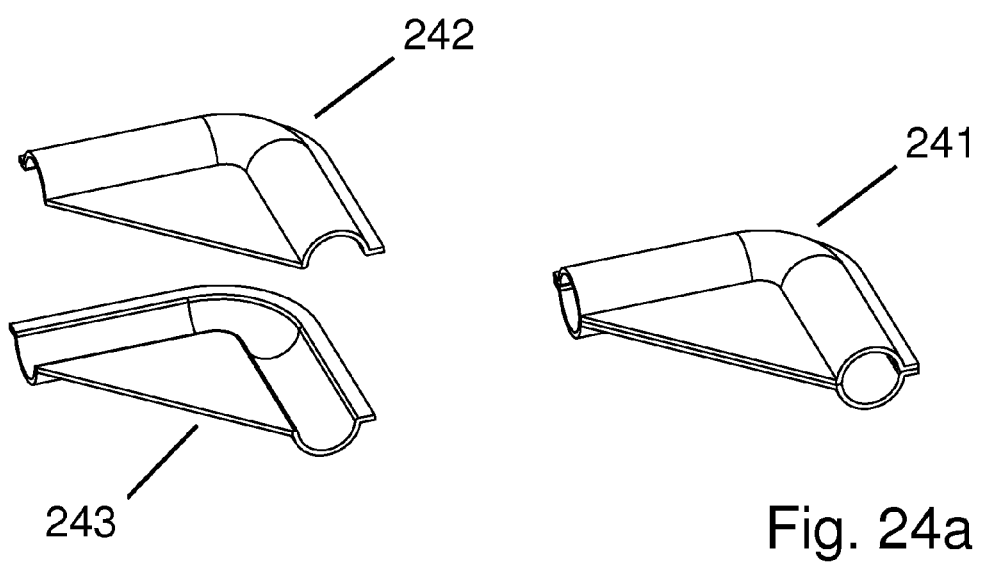
Figure 25:
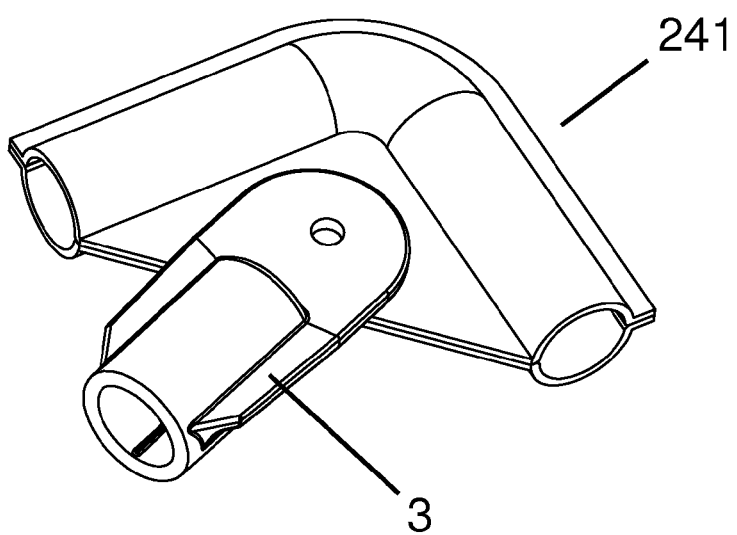
FIG. 25 shows a 2-dimensional 90 degree connector of FIG. 24 with a diagonal member bonded in place.

FIGS. 24a and 24b show a 2-dimensional 90 degree connector 241. The top half 242 of the connector and the bottom half 243 of the connector form the 90 degree connector 241. The complete 2-dimensional 90 degree connector 241 is shown in FIG. 25 attached to a diagonal member 3.

Figures 26A, 26B:
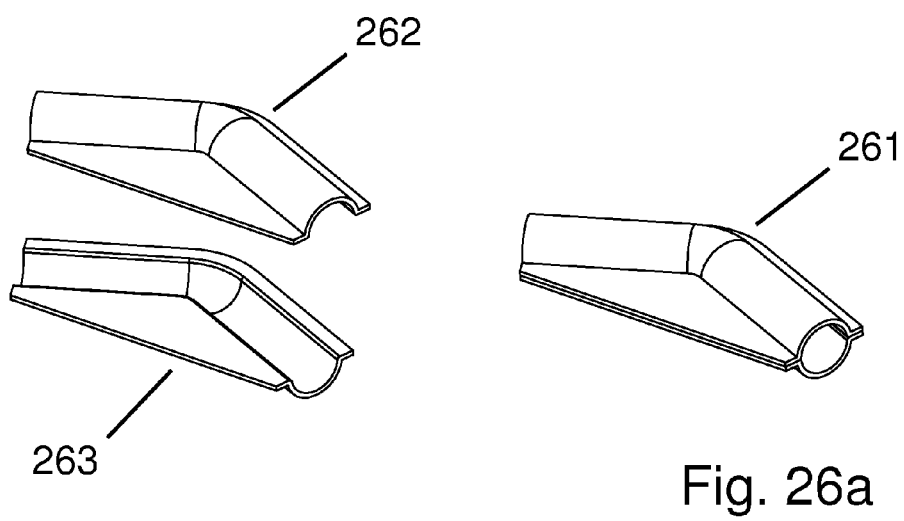
Figure 27:
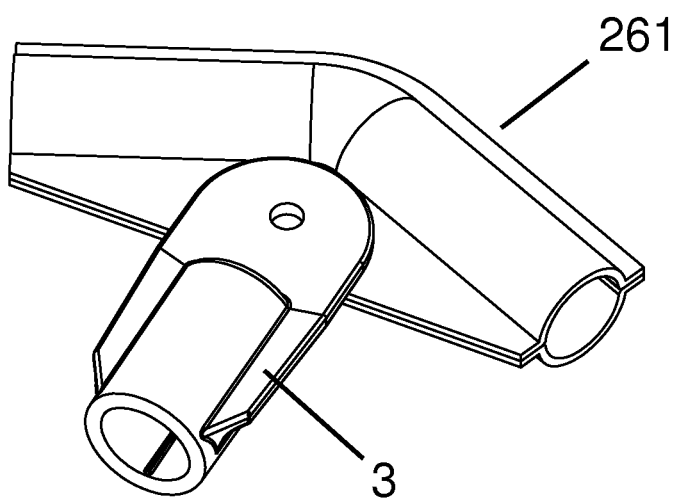
FIG. 27 shows a 2-dimensional 135 degree connector of FIG. 26 with a diagonal member bonded in place.

FIGS. 26a and 26b show a 2-dimensional 135 degree connector 261. The top half 262 of the connector and bottom half 263 of the connector form the 135 degree connector 261. The complete 2-dimensional 135 degree connector 261 is shown in FIG. 27 with a diagonal member 3 attached.

Figures 28A, 28B:
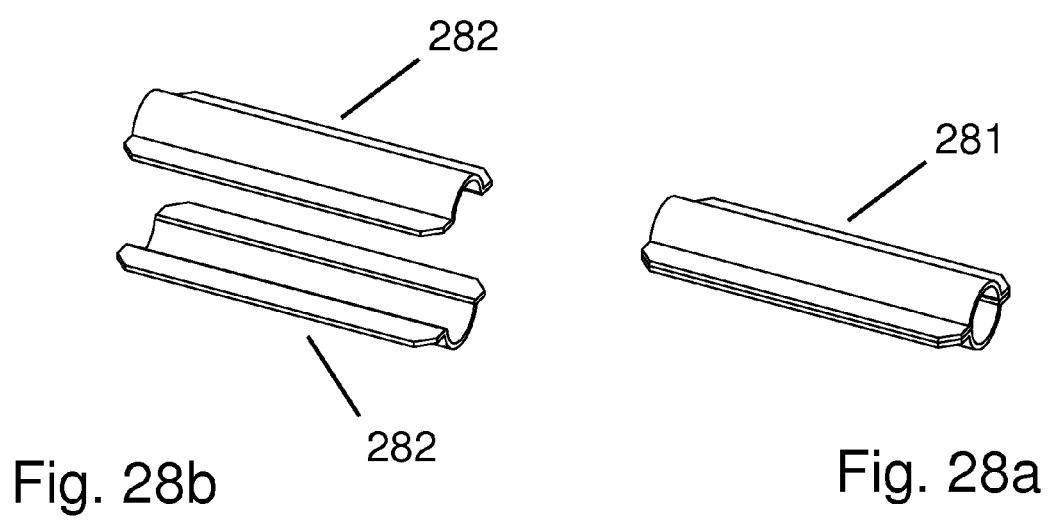

FIGS. 28a and 28b show an inline connector 281. Due to symmetry, both the top 282 and bottom 282 halves of the clamshell which comprise the inline connector 281 are identical.

Figures 29A, 29B:
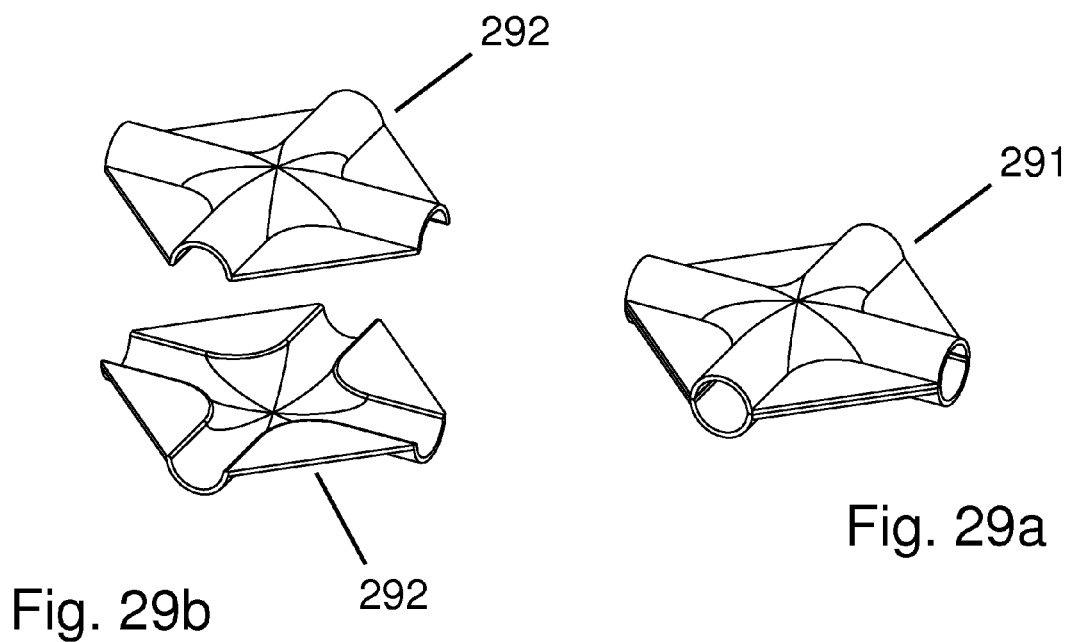
Figure 30:
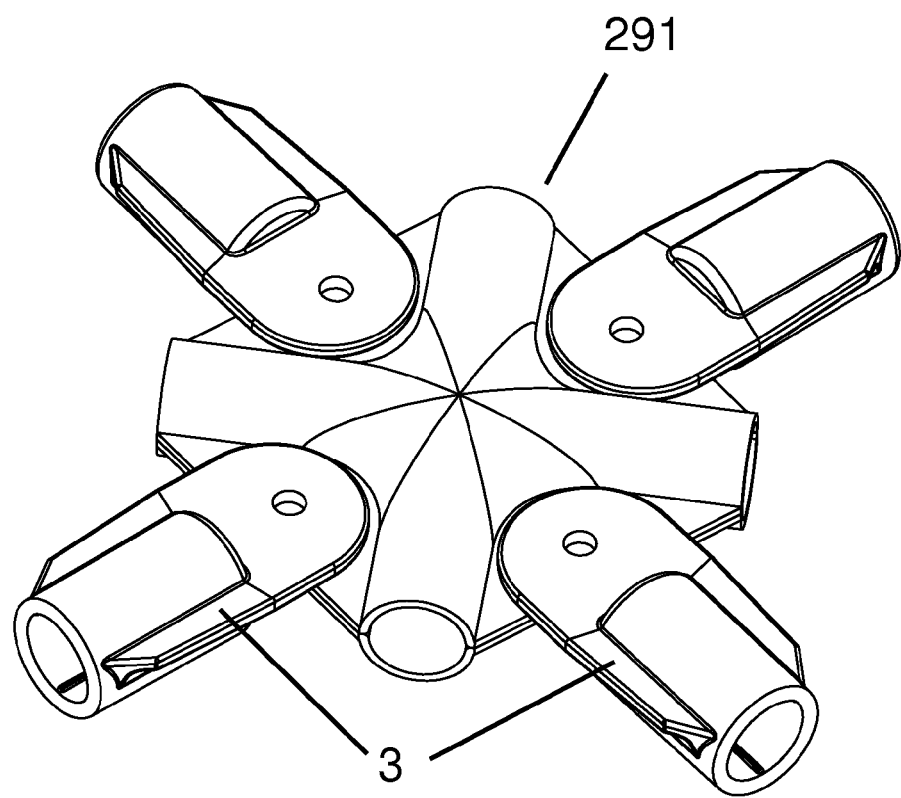
FIG. 30 shows a 2-dimensional 4-way connector of FIG. 29a with diagonal members bonded in place.

FIGS. 29a and 29b show a 2-dimensional 4-way connector 291 of the present invention. Due to symmetry, both the top 292 and bottom 292 halves of the clamshell which make up the 4-way connector 291 are identical. The complete 4-way connector 291 is shown in FIG. 30 with four diagonal members 3 attached.

Figure 31:
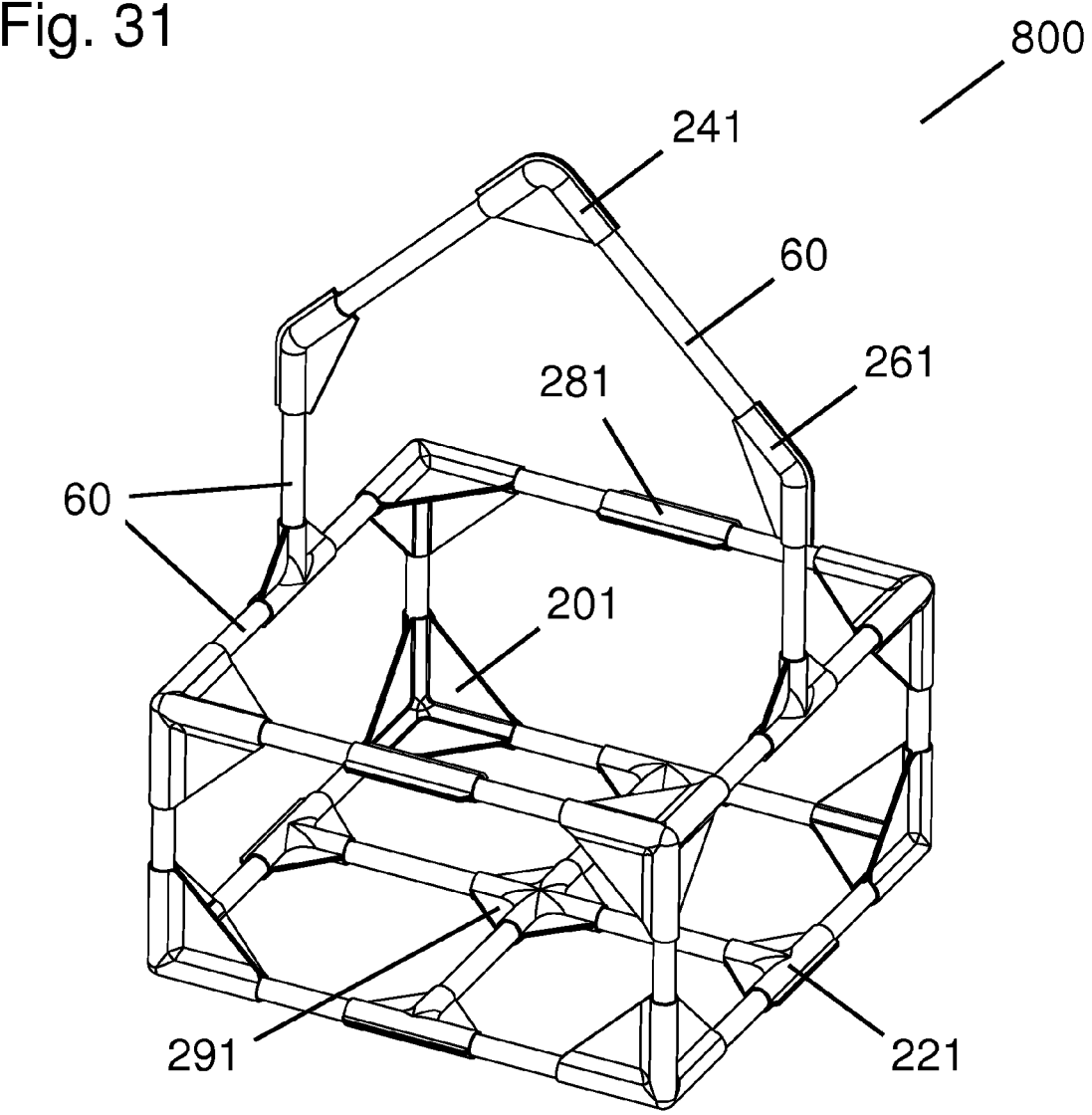
FIG. 31 shows a structure with several different types of connectors and carbon-fiber tubes or rods.

FIG. 31 shows an example of how each simplified connector can be utilized to form a structure 800. This structure includes 3-dimensional corner bracket connectors 201, 2-dimensional T connectors 221, 2-dimensional 90 degree connectors 241, 2-dimensional 135 degree connectors 261, inline connectors 281, and 2-dimensional 4-way connectors 291. As exemplified in this figure, there are a very large number of possibilities for the shape of the resulting structure.

Figure 32A:
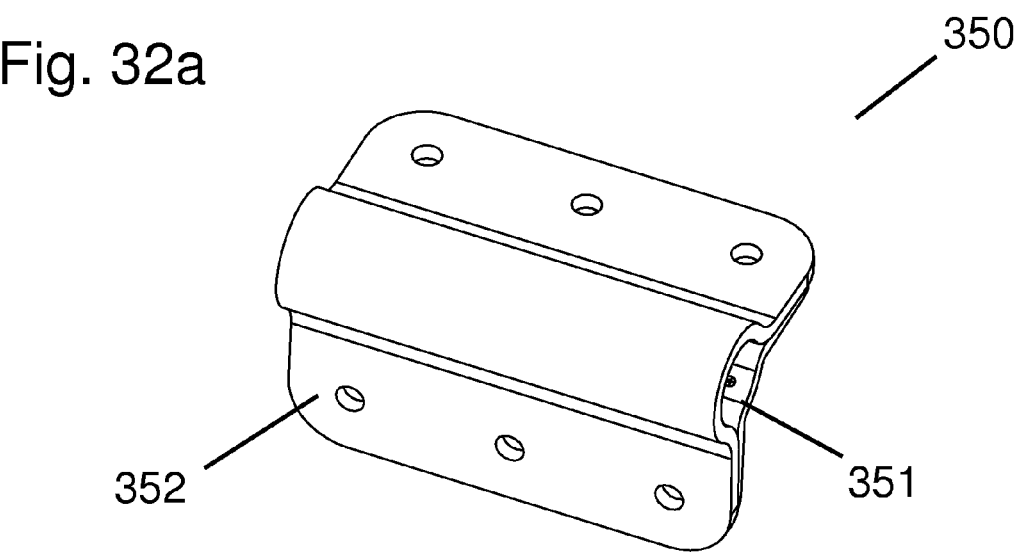
FIG. 32a shows a back side view of another 90 degree universal connector of the present invention.
Figure 32B:
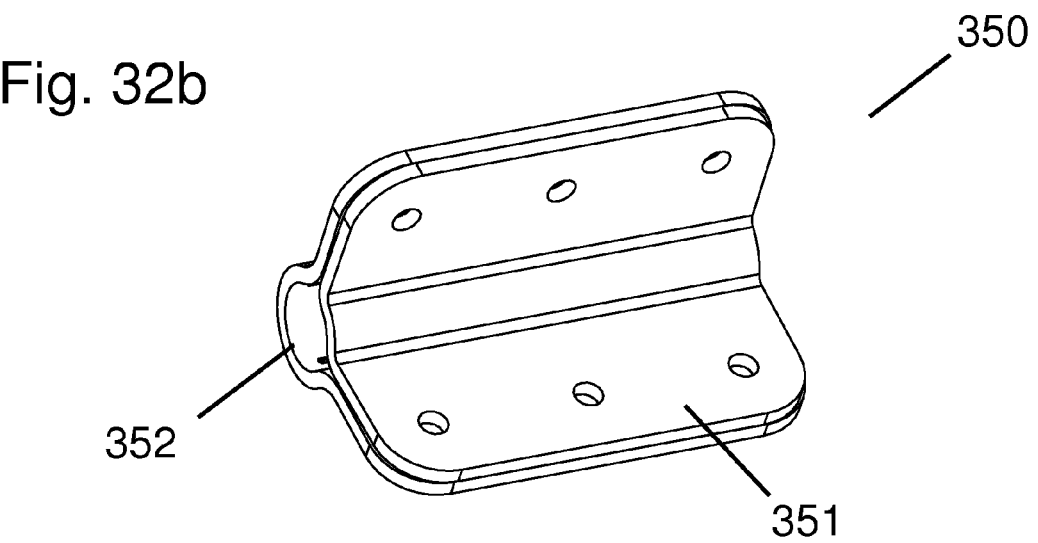

An alternative embodiment for the 90 degree angle universal connector 100 is shown in FIG. 32. FIG. 32a shows a back side view of a 90 degree angle universal connector 350 and FIG. 32b shows a front side view of the 90 degree angle universal connector 350.

Figure 33A:
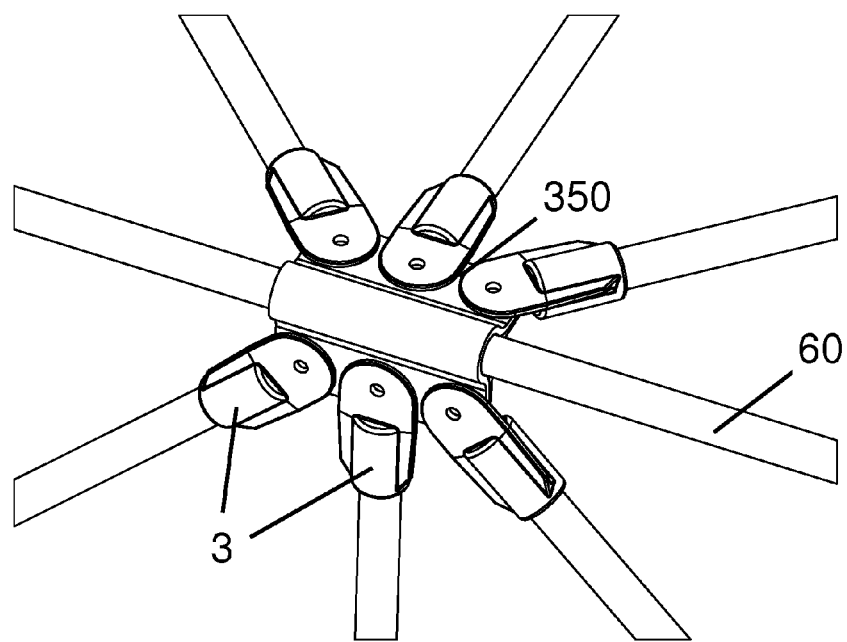
FIG. 33a shows a back side of the universal connector of FIG. 32a with diagonal members bonded in place.
Figure 33B:
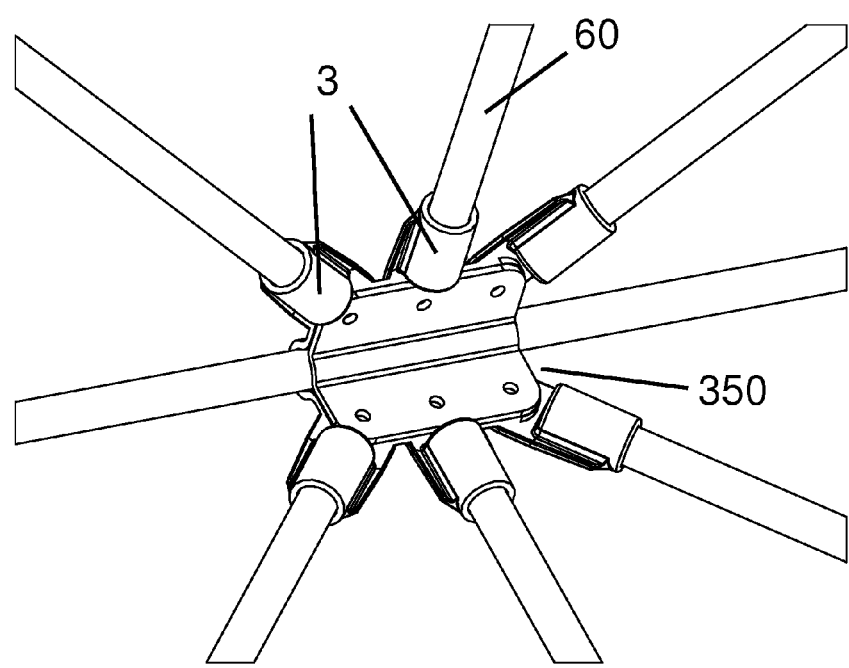
FIG. 33b shows a front side of the universal connector of FIG. 32a with diagonal members bonded in place.

This connector differs from the connector 100 shown in FIG. 1 by replacing the center tube receptacles with alignment holes for diagonal members 3, as shown in FIGS. 33a and 33b. The inner connector bracket 1 shown in FIG. 1 is replaced by an inner connector bracket 351, and the outer connector bracket 2 is replaced by an outer connector bracket 352.

Figure 34A:
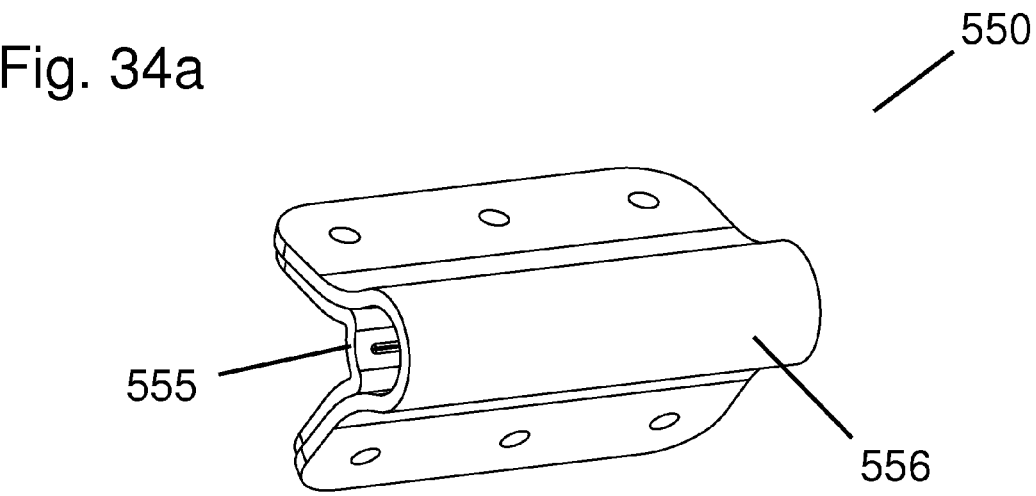
FIG. 34a shows a back side view of another 60 degree universal connector of the present invention.
Figure 34B:
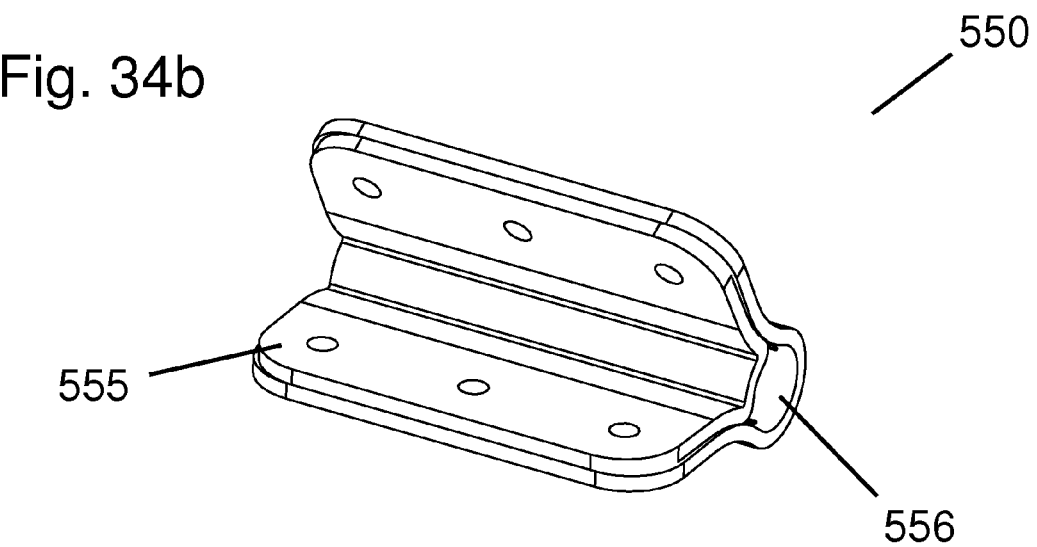
Figure 35A:
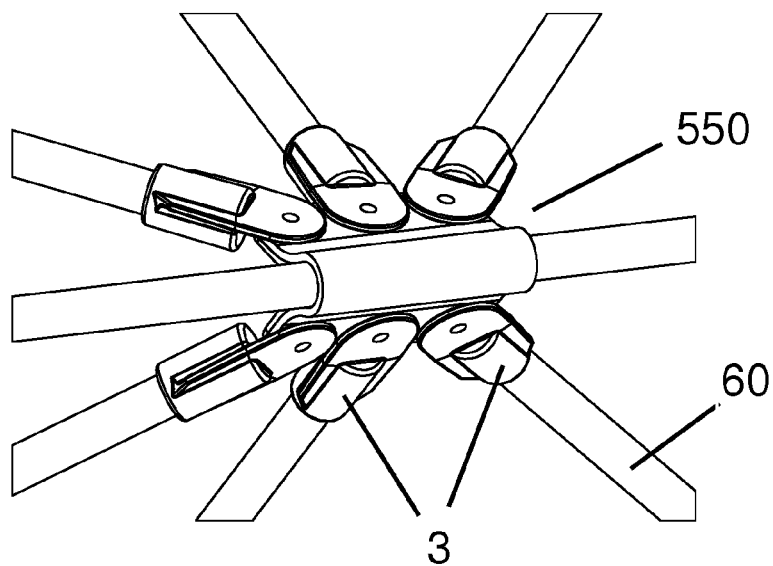
FIG. 35a shows a back side of the universal connector of FIG. 34a with diagonal members bonded in place.
Figure 35B:
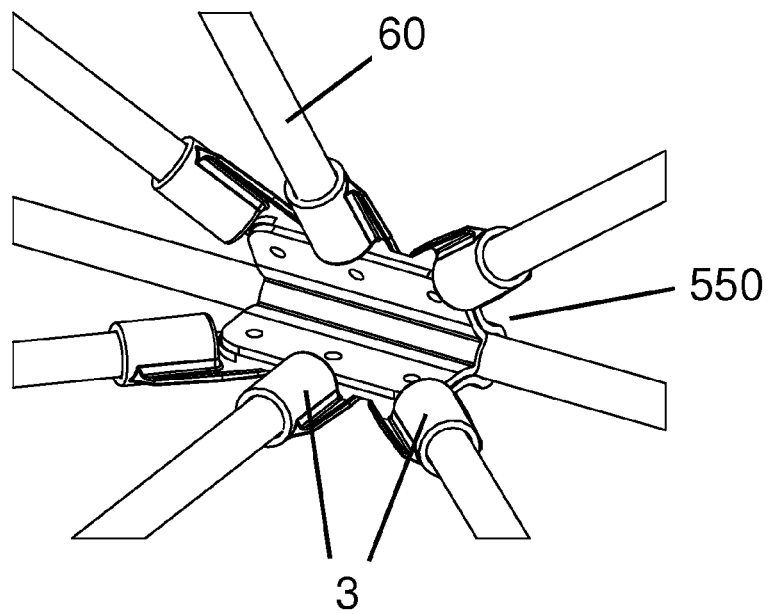
FIG. 35b shows a front side of the universal connector of FIG. 34a with diagonal members bonded in place.

An alternative embodiment for the 60 degree angle universal connector 500 is shown in FIG. 34. FIG. 34a shows a back side view of a 60 degree angle universal connector 550 and FIG. 34b shows a front side view of the 60 degree angle universal connector 550. This connector differs from the connector 500 shown in FIG. 10 by replacing the center tube receptacles with alignment holes for diagonal members 3, as shown in FIGS. 35a and 35b. The inner connector bracket 15 shown in FIG. 10 is replaced by an inner connector bracket 555, and the outer connector bracket 16 is replaced by an outer connector bracket 556.

Figure 36:
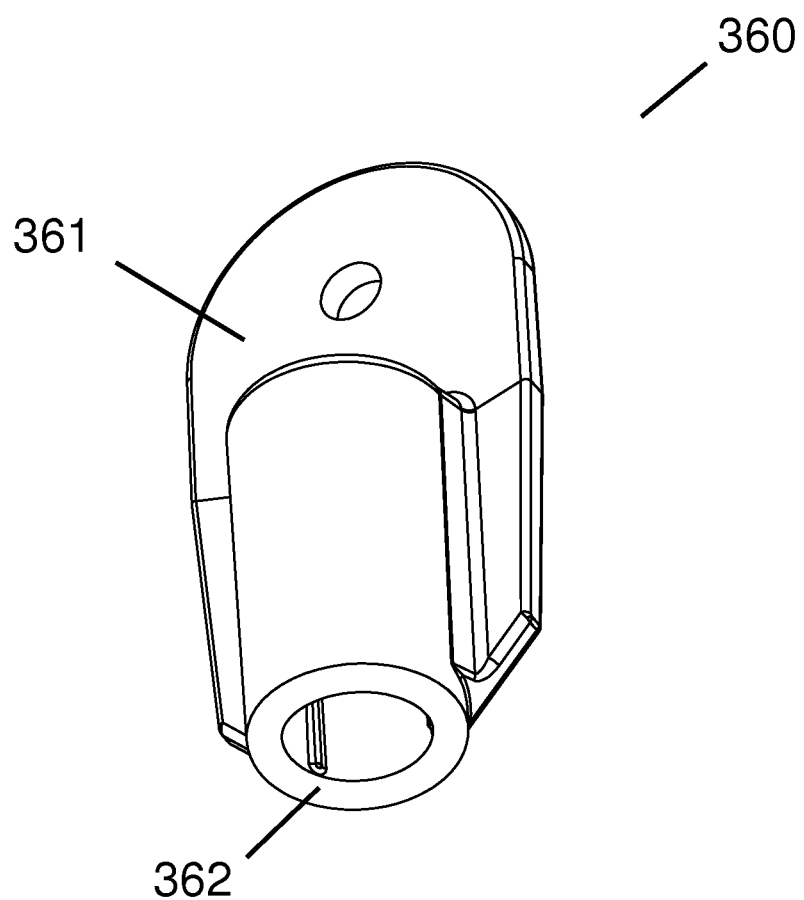
FIG. 36 shows the diagonal member of FIG. 1 with a smaller receptacle.

FIG. 36 shows an alternative embodiment for a diagonal member 360 where the tab portion 361 is the same as shown in FIGS. 1 and 4, but the receptacle portion 362 has a reduced diameter to accommodate a smaller tube. Other potential variations include, but are not limited to, a larger receptacle, a smaller tab, or a larger tab. These additional embodiments of the diagonal member give greater versatility to a structural design including tubes and the connectors in embodiments of the present invention. Some examples for receptacle diameters include, but are not limited to, ¼", ⅜", ½" ¾", and 1" (to accept tubes with those diameters). Some examples of tab widths include, but are not limited to, approximately ¾", 1", 1.5" and 2". The larger widths and diameters would be preferably used to accommodate larger diameter tubes. A preferred embodiment for a diagonal member includes a ½" receptacle (which fits a ½" diameter tube) and an approximately 1" width for the tabs. Other receptacle diameters and tab widths for the diagonal members may alternatively be used, and any combination of receptacle diameter and tab width may be chosen for particular designs to accommodate the needs of that particular design.

The diagonal members 3 and 360 and the variations of the diagonal members discussed herein are preferably attached to the connectors shown in the figures by adhesive; however, there are other ways of securing the diagonal member 3 and 360 including, but not limited to, fasteners, clips and weldments. The diagonal member 360 shown in FIG. 36, as well as the variations for the diagonal member discussed in this paragraph, may be used in any combination with any of the connectors discussed herein.

Figure 37A:
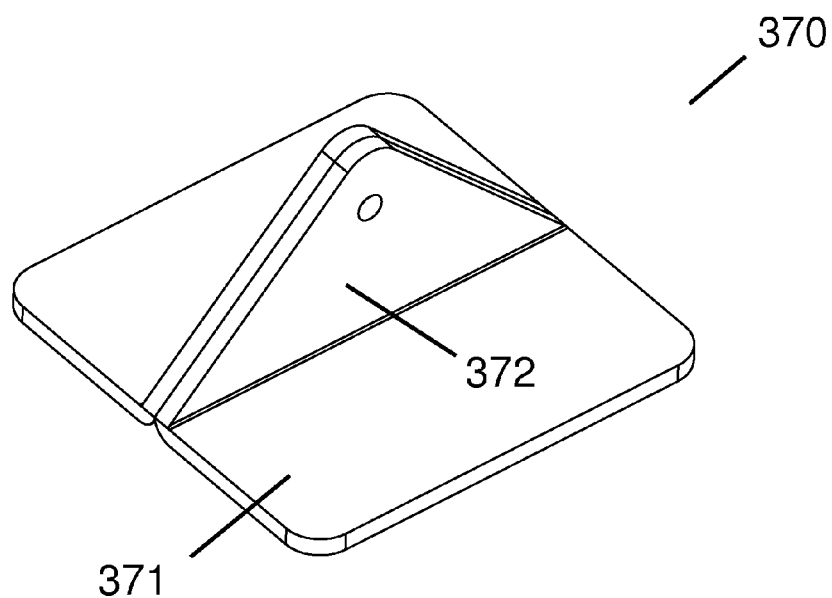
FIG. 37a shows an angle termination connector in an embodiment of the present invention.
Figure 37B:
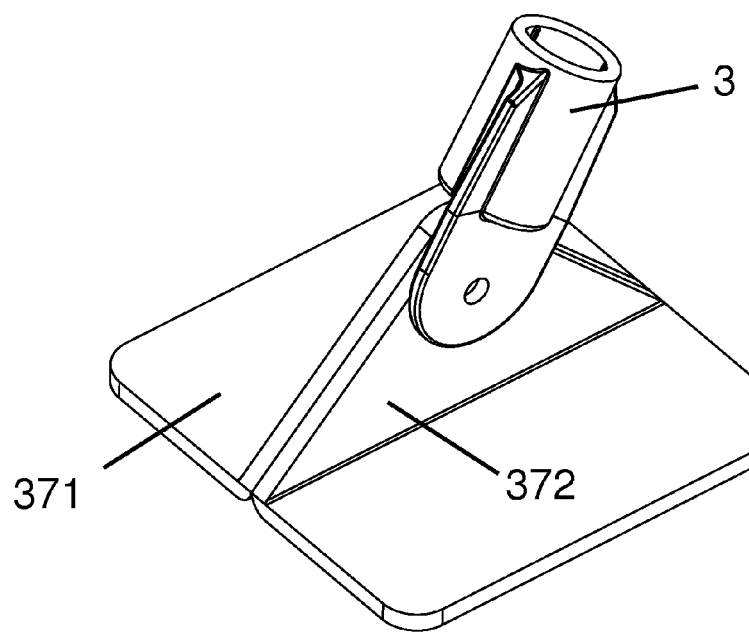
FIG. 37b shows the angle termination connector of FIG. 37a with a diagonal member attached.

FIGS. 37a and 37b show an angle termination connector 370 in an embodiment of the present invention. The flat side 371 bonds to another flat surface, such as a plate, while the diagonal member 3, shown in FIG. 37b, connects to the angled side 372 and is used to connect to the end of a tube of the structure. Note that, in this figure and those that follow, the diagonal member 3 is attached to the connector by adhesive. While this attachment method is preferred, other attachment means, including, but not limited to, fasteners, clips and weldments, could alternatively be used.

Figure 38A:
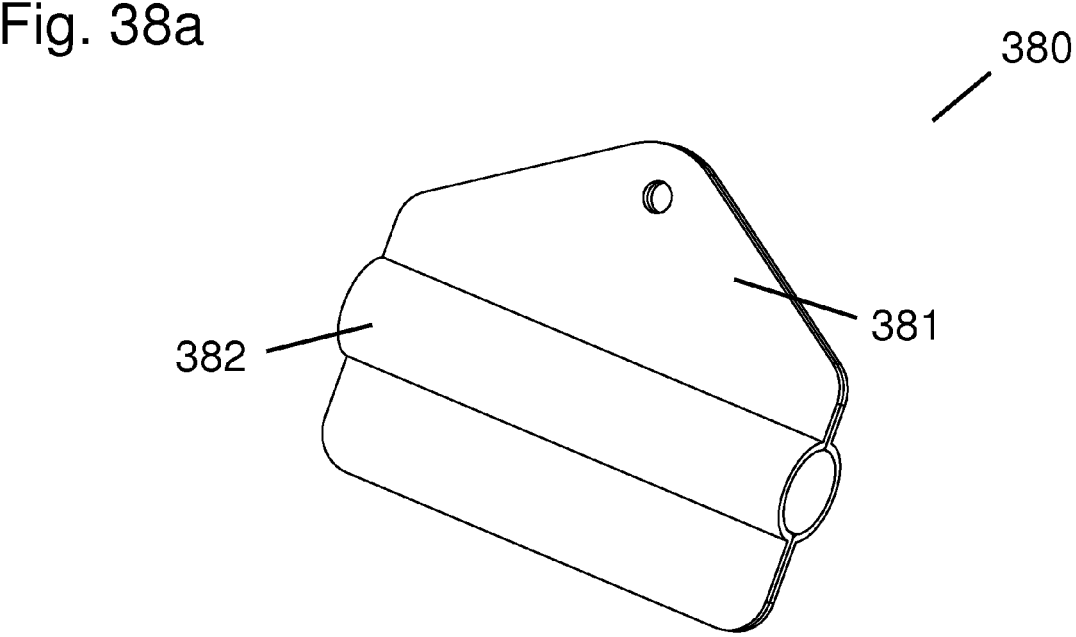
FIG. 38a shows an inline connector in an embodiment of the present invention.
Figure 38B:
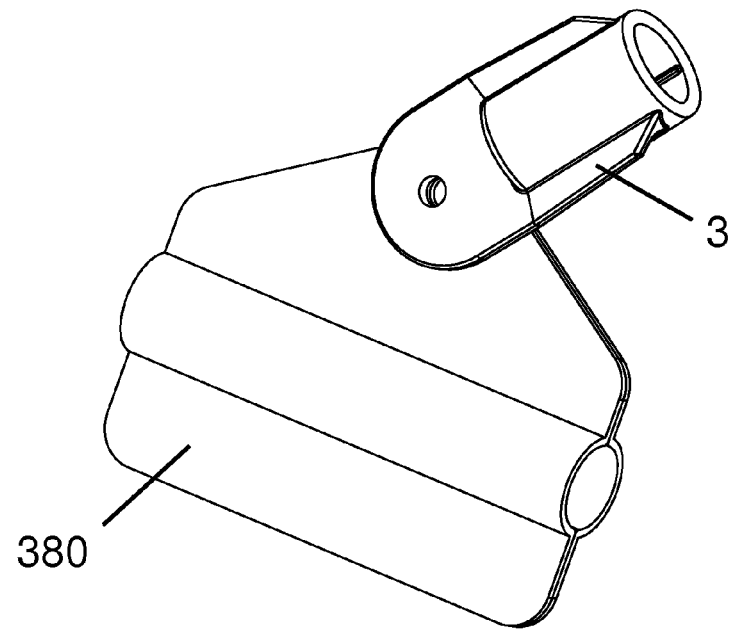
FIG. 38b shows the inline connector of FIG. 38a with a diagonal member attached.
Figure 39:
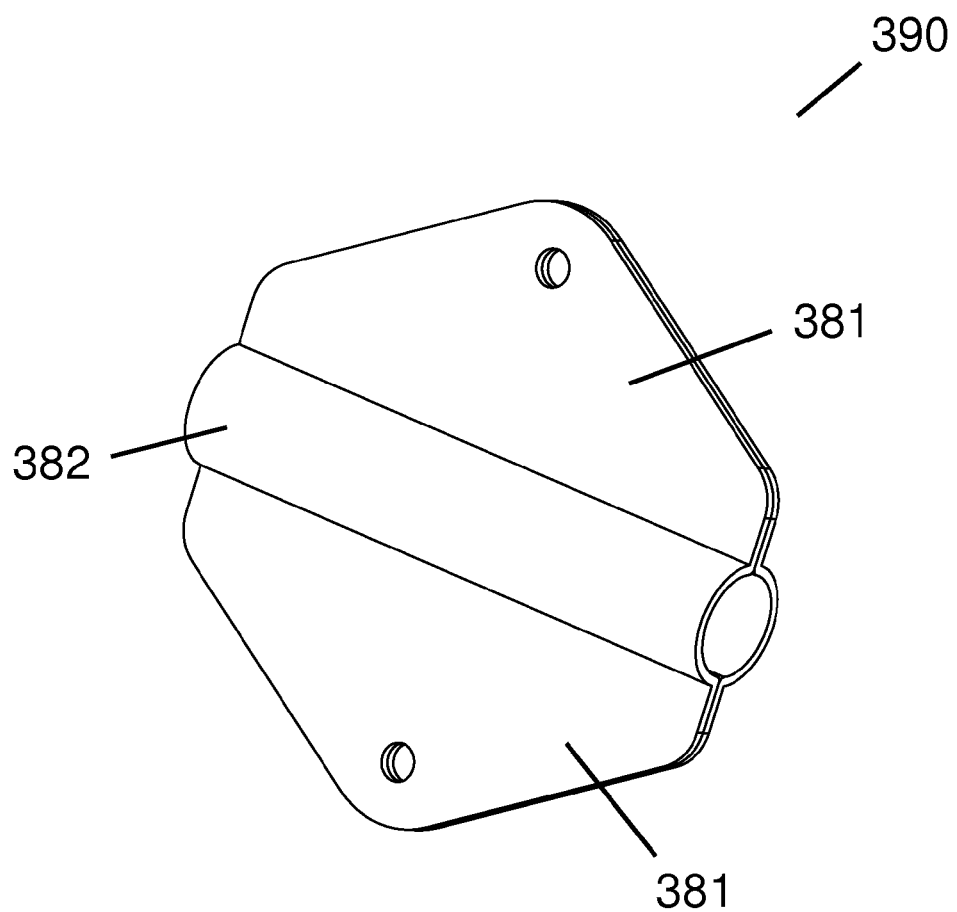
Figure 40A:
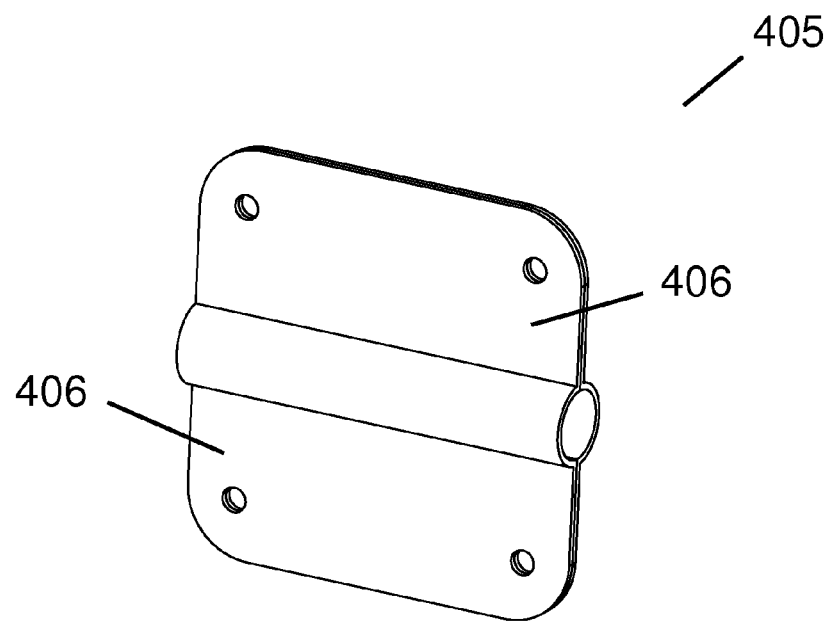
FIG. 40a shows an alternate embodiment for the inline connector of FIG. 39.
Figure 40B:
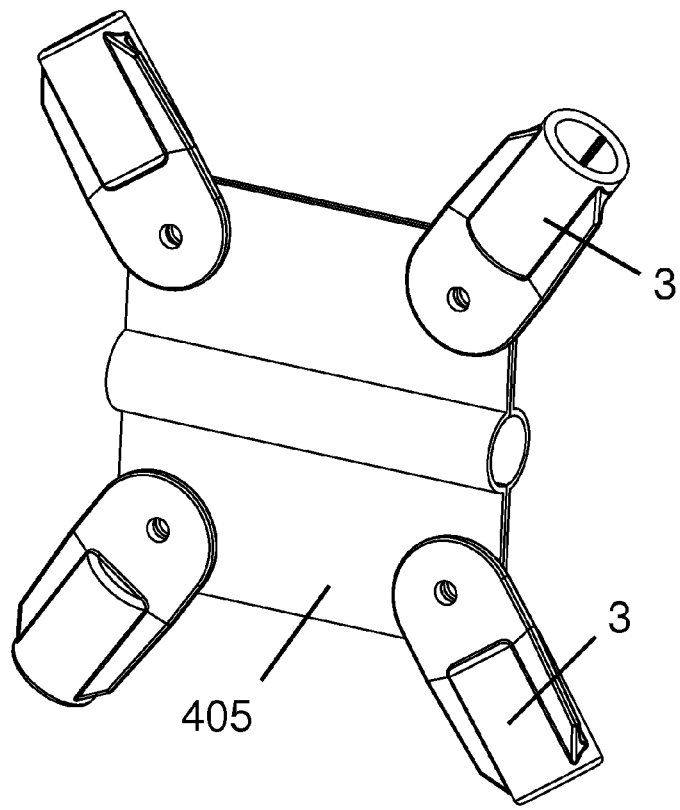
FIG. 40b shows the inline connector of FIG. 40a with four diagonal members attached.

FIGS. 38a and 38b show an inline connector 380 in an embodiment of the present invention. This connector can be used as a splice to join two inline tubes, or as a means to add another tube at an arbitrary angle relative to the primary tube. This is accomplished using a diagonal members 3, as shown in FIG. 38b. An alternate embodiment of the inline connector 390, which has a double flange 381 instead of the single flange 381 shown in FIG. 38a, is shown in FIG. 39. Connector 390 can accept diagonal members on either side of the inline portion 382. Another embodiment of the inline connector 405, which has an alternatively shaped double flange 406 able to accept multiple diagonal members 3, is shown in FIGS. 40a and 40b.

Figure 41A:
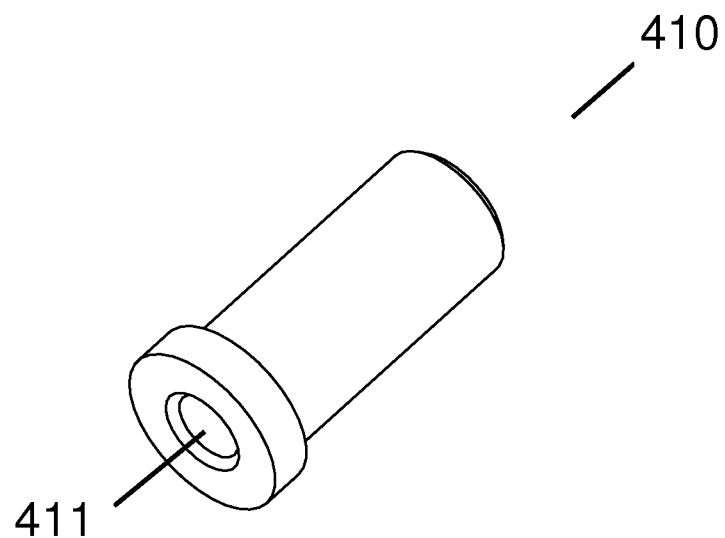
FIG. 41a shows a tube end insert piece in an embodiment of the present invention.
Figure 41B:
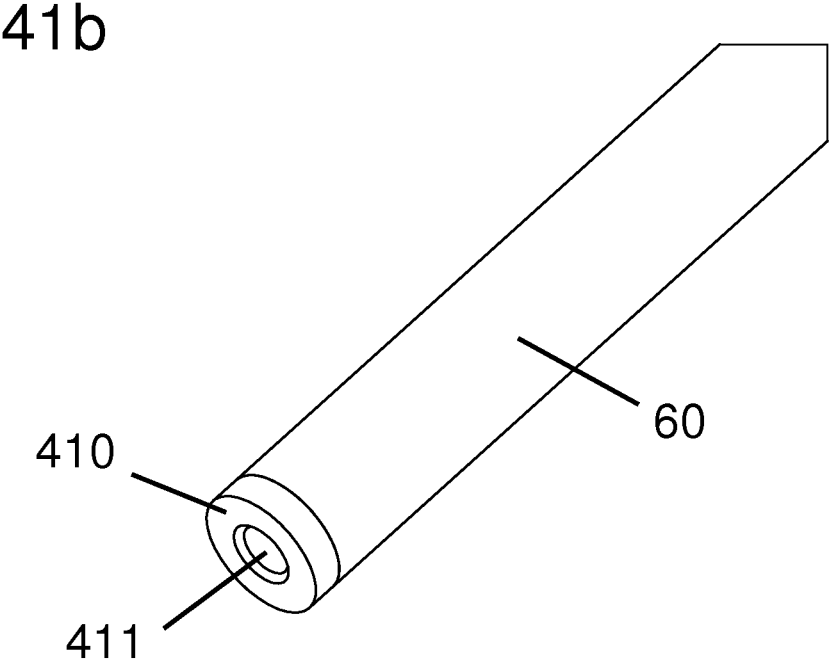
FIG. 41b shows the tube end insert of FIG. 41a placed inside the end of a tube.

A tube end insert 410 is shown in FIG. 41a. This component is used to attach additional parts to the truss structure off the end of a tube. FIG. 41b shows the tube end insert 410 bonded into place within the end of a tube 60. The hole 411 in the end of the tube insert 410 can be smooth or threaded, and allows for additional connections.

Figure 42:
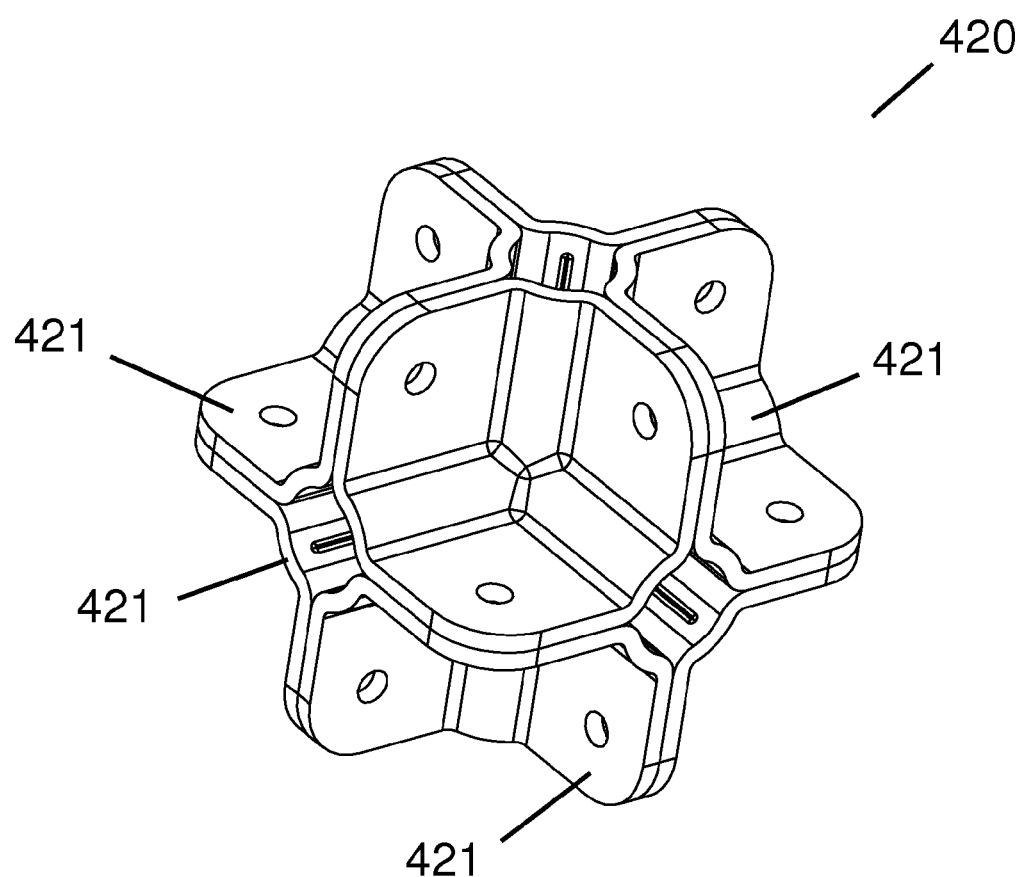
FIG. 42 shows eight universal connector pieces combined to form a 3-dimensional 90 degree universal connector in an embodiment of the present invention.
Figure 43A:
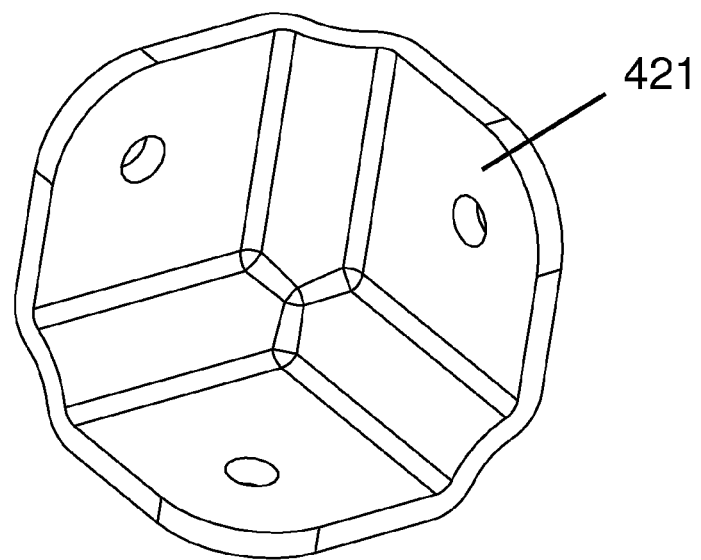
FIG. 43a shows an outer view of a 3-dimensional 90 degree universal connector piece in an embodiment of the present invention.
Figure 43B:
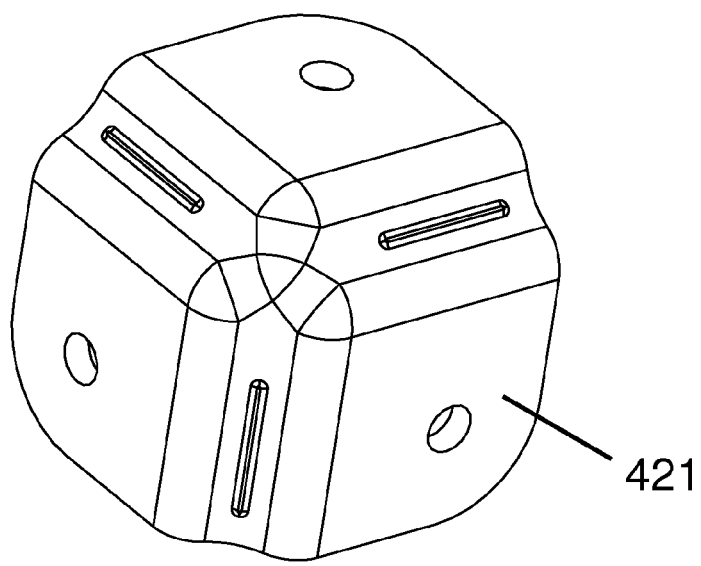
Figure 44:
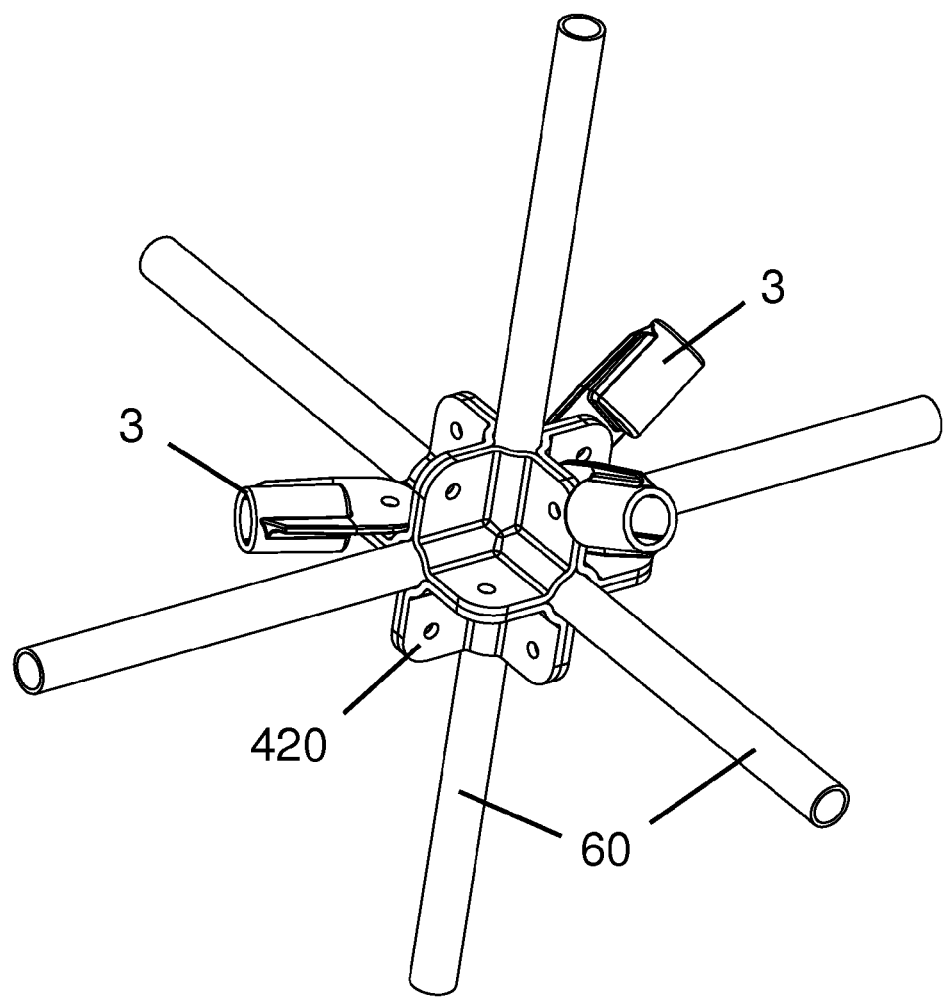
FIG. 44 shows the 3-dimensional 90 degree universal connector of FIG. 42 with tubes inserted into the receptacles for each primary orthogonal axis and three diagonal members attached.

One example of a 3-dimensional 90 degree universal connector 420 for creating truss and frame structures is shown in FIG. 42. This connector includes up to eight pieces 421 bonded together. Individual components 421 are shown in FIGS. 43a and 43b. In FIG. 44, connector 420 is shown with tubes 60 bonded into place in the three primary orthogonal directions. In addition to tubes 60 being inserted into the receptacles, diagonal members 3 can be attached to one or more of the flat sides of a universal connector 420. FIG. 44 shows the universal connector 420 with three diagonal members attached; however, up to twelve diagonal members can be attached simultaneously in the embodiment shown, giving great versatility to the design.

Figure 45:
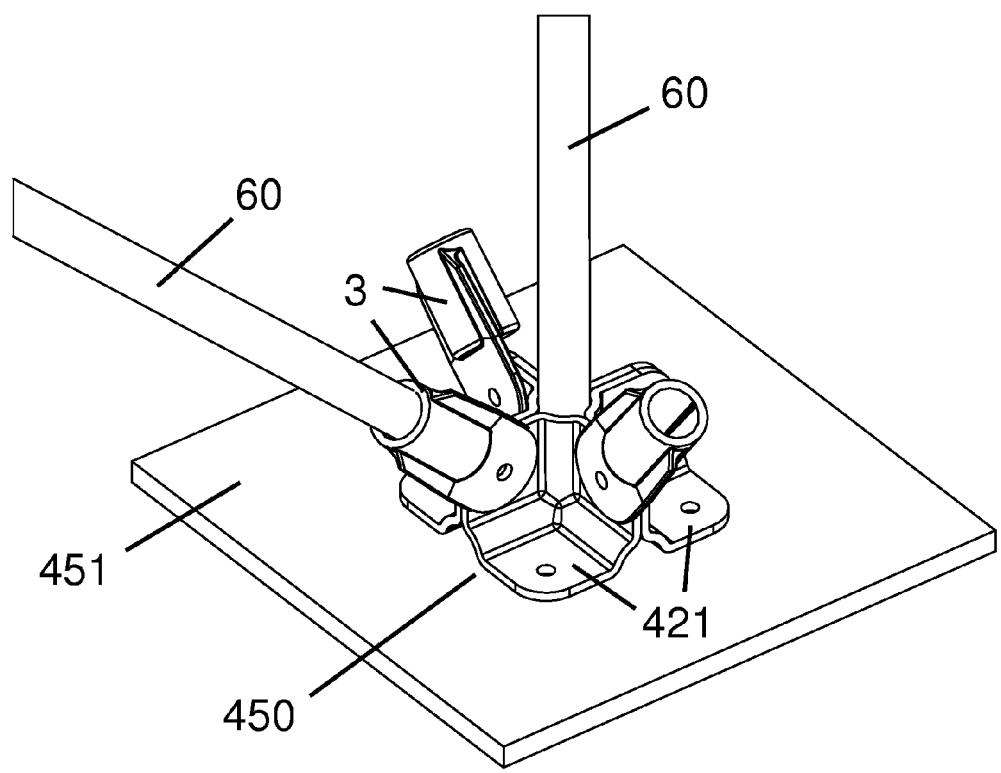
FIG. 45 shows a 3-dimensional 90 degree universal connector utilizing four components and attached to a plate.

In addition to the complete connector, individual components of the universal connector 420 can be excluded, giving further versatility. For example, FIG. 45 shows a universal connector 450 comprised of four individual connector pieces 421, and providing a flat surface convenient for bonding to a flat plate 451. The connectors 421 are preferably bonded to the flat plate 451 with an adhesive.

Figure 46A:
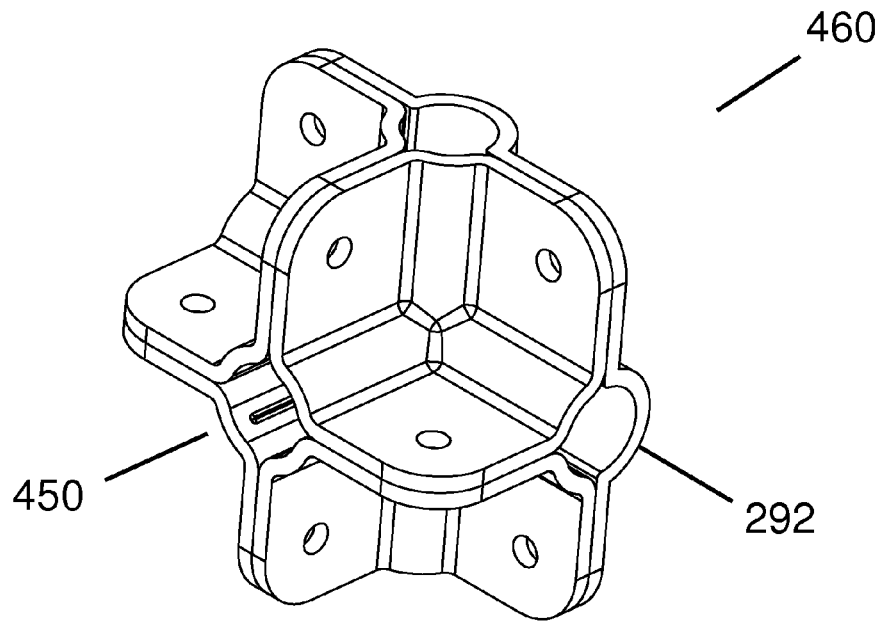
FIG. 46a shows a universal connector including four individual connector pieces and a 2-dimensional 4-way connector.
Figure 46B:
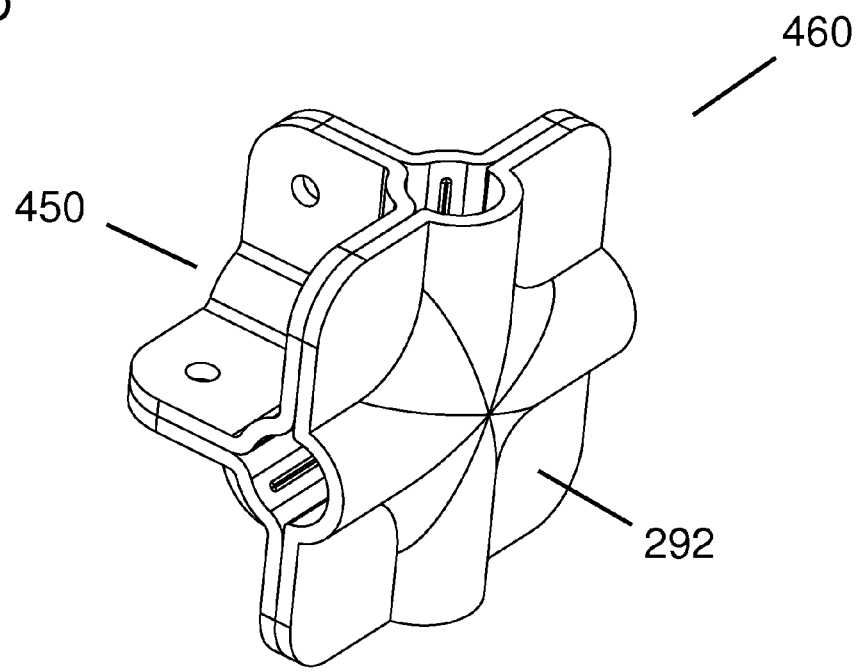

FIGS. 46a and 46b show a universal connector 450 and a 2-dimensional 4-way connector piece 292 bonded together to form a new connector 460.

Figure 47:
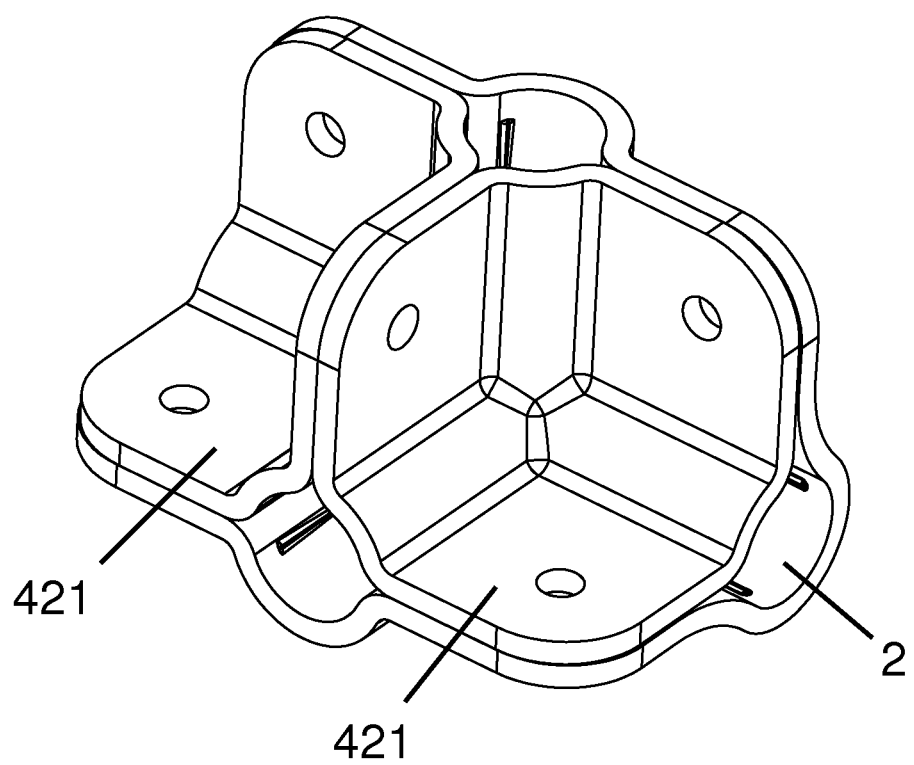
FIG. 47 shows two 3-dimensional 90 degree universal connectors and one 90 degree angle universal connector bonded together.

FIG. 47 shows two 3-dimensional 90 degree universal connector pieces 421 and one 90 degree angle universal connector outer bracket 2 in an embodiment of the present invention. The design of these connectors allows them to be bonded together as shown in FIG. 47.

In addition to the manufacturing method presented here, instead of fabricating and assembling the inner connector bracket 1 and outer connector bracket 2 as two separate pieces, an alternative embodiment utilizes a single injection molded part, with the two halves combined into one. In this embodiment, the tubes or rods would slide into the connector in a similar fashion to standard plastic tube fittings, instead of the connector assembled in two halves.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A universal connector, comprising:
   a) a plurality of connector brackets, wherein each connector bracket comprises:
      i) a first side;
      ii) a second side orthogonal to the first side;
      iii) a third side orthogonal to both the first side and the second side;
      iv) a first curved channel aligned along a first axis where the first side and the second side meet;
      v) a second curved channel aligned along a second axis where the first side and the third side meet; and
      vi) a third curved channel aligned along a third axis where the second side and the third side meet;
      wherein the plurality of connector brackets attach together to form a structure having at least one opening formed by the channels into which a plurality of tubes or rods can be placed; and
   b) at least one diagonal member having an opening into which a tube or rod can be placed, wherein the at least one diagonal member is variably attached to the structure such that the diagonal member can be aligned at an angle between 0 and 90 degrees in relation to at least one of the openings in the structure.

2. The universal connector of claim 1, further comprising a plurality of adhesive ridge gauges on an inner surface of the opening of the at least one diagonal member and in the channels of the connector brackets.

3. The universal connector of claim 1, wherein the connector brackets comprise at least four connector brackets.

4. The universal connector of claim 1, wherein the connector brackets comprise eight connector brackets aligned such that up to six tubes or rods can be placed in the connector brackets.

5. The universal connector of claim 1, wherein channels from four connector brackets form each opening.

6. The universal connector of claim 1, wherein at least three connector brackets are adhesively bonded together.

7. The universal connector of claim 1, wherein at least one tube or rod is adhesively bonded to at least one of the curved channels.

\* \* \* \* \*